US009916843B2

(12) United States Patent
Togawa et al.

(10) Patent No.: US 9,916,843 B2
(45) Date of Patent: Mar. 13, 2018

(54) VOICE PROCESSING APPARATUS, VOICE PROCESSING METHOD, AND NON-TRANSITORY COMPUTER-READABLE STORAGE MEDIUM TO DETERMINE WHETHER VOICE SIGNALS ARE IN A CONVERSATION STATE

(71) Applicant: FUJITSU LIMITED, Kawasaki-shi, Kanagawa (JP)

(72) Inventors: Taro Togawa, Kawasaki (JP); Sayuri Kohmura, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/266,057

(22) Filed: Sep. 15, 2016

(65) Prior Publication Data

US 2017/0092294 A1   Mar. 30, 2017

(30) Foreign Application Priority Data

Sep. 24, 2015   (JP) ................... 2015-186617

(51) Int. Cl.
*G10L 25/06*   (2013.01)
*G10L 25/78*   (2013.01)
(Continued)

(52) U.S. Cl.
CPC ............. *G10L 25/06* (2013.01); *G10L 25/51* (2013.01); *G10L 25/78* (2013.01); *G10L 17/005* (2013.01); *G10L 2025/783* (2013.01)

(58) Field of Classification Search
CPC . G10L 21/0272; G10L 21/0308; G10L 25/06; G10L 25/51; G10L 25/78; G10L 2025/783
(Continued)

(56) References Cited

U.S. PATENT DOCUMENTS 9,443,521 B1 *   9/2016   Olguin Olguin ....... G10L 17/00
9,661,139 B2 *   5/2017   Harma ................ H04M 1/6033
(Continued)

FOREIGN PATENT DOCUMENTS

JP   2001-045454   2/2001
JP   2010-266522   11/2010

OTHER PUBLICATIONS

Wyatt, Danny et al.,"Inferring Colocation and Conversation Networks from Privacy-Sensitive Audio with Implications for Computational Social Science", ACM Transactions on Intelligent Systems and Technology, vol. 2, No. 1, Article 7, pp. 1-41, Jan. 1, 2011.
(Continued)

*Primary Examiner* — Martin Lerner
(74) *Attorney, Agent, or Firm* — Fujitsu Patent Center

(57) ABSTRACT

A voice processing apparatus including a memory, and a processor coupled to the memory and the processor configured to acquire a first input signal containing a first voice, and a second input signal containing a second voice, obtain a first signal intensity of the first input signal, and a second signal intensity of the second input signal, specify a correlation coefficient between a time sequence of the first signal intensity and a time sequence of the second signal intensity, determine whether the first voice and the second voice are in the conversation state or not based on the specified correlation coefficient, and output information indicating an association between the first voice and the second voice when it is determined that the first voice and the second voice are in the conversation state.

13 Claims, 18 Drawing Sheets

(51) Int. Cl.
*G10L 25/51* (2013.01)
*G10L 17/00* (2013.01)

(58) Field of Classification Search
USPC ........ 704/210, 215, 216, 217, 218, 236, 237
See application file for complete search history.

(56) References Cited

U.S. PATENT DOCUMENTS

| | | | |
|---|---|---|---|
| 2008/0243494 A1 | 10/2008 | Okamoto et al. | |
| 2013/0144622 A1* | 6/2013 | Yamada | G10L 25/48 704/248 |
| 2013/0301837 A1 | 11/2013 | Kim et al. | |
| 2014/0012576 A1* | 1/2014 | Yamada | G10L 17/005 704/249 |
| 2014/0046665 A1* | 2/2014 | Aoki | G10L 17/005 704/248 |
| 2014/0270114 A1* | 9/2014 | Kolbegger | G10L 25/93 379/88.08 |
| 2015/0302868 A1* | 10/2015 | Sikveland | G10L 25/51 704/239 |
| 2015/0332674 A1* | 11/2015 | Nishino | G10L 25/51 704/246 |
| 2015/0340048 A1* | 11/2015 | Shioda | G10L 21/02 704/225 |
| 2016/0217791 A1* | 7/2016 | Togawa | G10L 17/005 |

OTHER PUBLICATIONS

Partial European Search Report dated Dec. 21, 2016 for corresponding European Patent Application No. 16188938.1, 6 pages.
Extended European Search Report dated Mar. 22, 2017 for corresponding European Patent Application No. 16188938.1, 10 pages.

* cited by examiner

FIG. 11

|  | RECALL RATIO (%) | PRECISION RATIO (%) |
|---|---|---|
| COMPARATIVE EXAMPLE | 100 | 5 |
| EXAMPLE | 100 | 91 |

FIG. 13

| SPEAKER CHANGE COUNT WITHIN CORRELATION COEFFICIENT CALCULATION PERIOD | CORRELATION COEFFICIENT IN CONVERSATION STATE | CORRELATION COEFFICIENT IN NON-CONVERSATION STATE |
|---|---|---|
| 8 > | -0.65 | 0.00 |
| 8 | -0.65 | 0.00 |
| 6 | -0.60 | 0.04 |
| 4 | -0.56 | -0.60 |
| 2 | -0.36 | -0.45 |

FIG. 14

| COMBINATION ID | COMBINATION OF SIGNAL INTENSITIES | | CORRELATION COEFFICIENT |
|---|---|---|---|
| 1 | FIRST SIGNAL INTENSITY | SECOND SIGNAL INTENSITY | -0.54 |
| 2 | FIRST SIGNAL INTENSITY | THIRD SIGNAL INTENSITY | 0.21 |
| 3 | FIRST SIGNAL INTENSITY | FOURTH SIGNAL INTENSITY | 0.46 |
| 4 | SECOND SIGNAL INTENSITY | THIRD SIGNAL INTENSITY | -0.61 |
| 5 | SECOND SIGNAL INTENSITY | FOURTH SIGNAL INTENSITY | -0.21 |
| 6 | THIRD SIGNAL INTENSITY | FOURTH SIGNAL INTENSITY | 0.63 |

VOICE PROCESSING APPARATUS, VOICE PROCESSING METHOD, AND NON-TRANSITORY COMPUTER-READABLE STORAGE MEDIUM TO DETERMINE WHETHER VOICE SIGNALS ARE IN A CONVERSATION STATE

CROSS-REFERENCE TO RELATED APPLICATION

This application is based upon and claims the benefit of priority of the prior Japanese Patent Application No. 2015-186617, filed on Sep. 24, 2015, the entire contents of which are incorporated herein by reference.

FIELD

The embodiments discussed herein are related to a voice processing apparatus, a voice processing method, and a non-transitory computer-readable storage medium.

BACKGROUND

To learn whether smooth communication is maintained among employees in some corporations, each employee wears a recording device (such as a microphone) to continuously record the voice of the employee. The continuous recording of the voice of each employee may pick up conversation voices in a variety of communications, including conversation voices face to face in a conference or chatting (also referred to as voice data), and telephone conversation voices. The voice data continuously recorded may be used to learn who converses with who for how long, and to study whether smooth communication is achieved among the employees.

The related art technique described above is disclosed in Japanese Laid-open Patent Publication No. 2010-266522.

SUMMARY

According to an aspect of the invention, a voice processing apparatus including a memory, and a processor coupled to the memory and the processor configured to acquire a first input signal containing a first voice, and a second input signal containing a second voice, obtain a first signal intensity of the first input signal, and a second signal intensity of the second input signal, specify a correlation coefficient between a time sequence of the first signal intensity and a time sequence of the second signal intensity, determine whether the first voice and the second voice are in the conversation state or not based on the specified correlation coefficient, and output information indicating an association between the first voice and the second voice when it is determined that the first voice and the second voice are in the conversation state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 illustrates determination performance of a combination of voice data in the conversation state, derived from voice data containing voices of multiple speakers in accordance with Example 1 and a comparative example;

FIG. 13 illustrates a relationship between a speaker change count within in the correlation coefficient calculation period and the correlation coefficient calculated from the correlation coefficient calculation period in the conversation state or non-conversation state;

FIG. 14 illustrates a table of the correlation coefficients responsive to a combination of signal intensities;

DESCRIPTION OF EMBODIMENTS

Continuously recorded voice data may be used to analyze who converses with who for how long. A combination of voice data corresponding to actually speaking persons in conversation is to be determined from voice data of voices that are individually recorded from multiple speakers. In this case, an evaluator performs a manual operation to determine the combination of the voice data in a subjective evaluation. If the size of the voice data that is used in the combination determination operation is large, it may be difficult for the evaluator to identify a speaker corresponding to the voice data. On the other hand, there is no voice processing apparatus available that determines a combination of the voice data corresponding to the multiple speakers in conversation from the voice data that is a record of voices of the speakers. Embodiments provide a voice processing apparatus that determines a combination of audio data corresponding to speakers in conversation.

Examples of a voice processing apparatus, a voice processing method, and a voice processing program according to an embodiment are described in detail below with reference to the drawings. The examples are not intended to limit the technique disclosed herein.

Example 1

Figure 1:
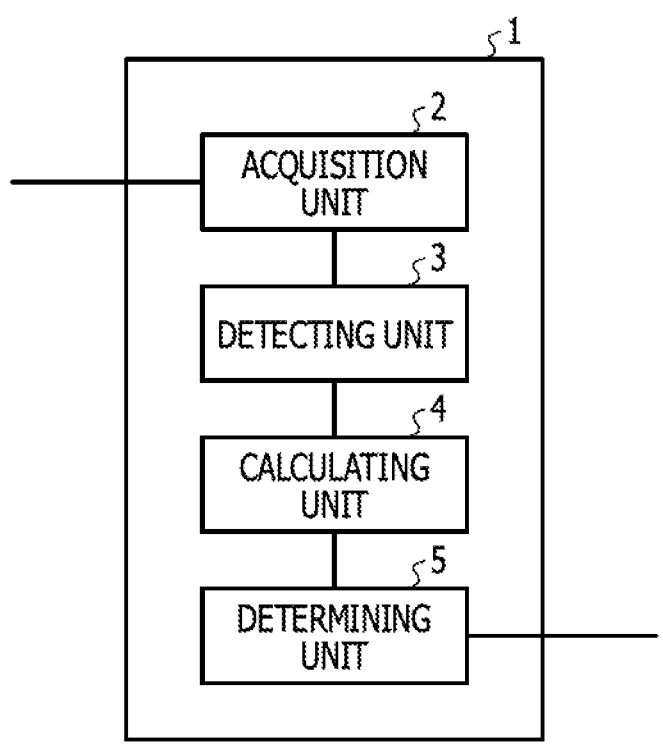
FIG. 1 is a functional block diagram of a voice processing apparatus of a first embodiment.
Figure 2:
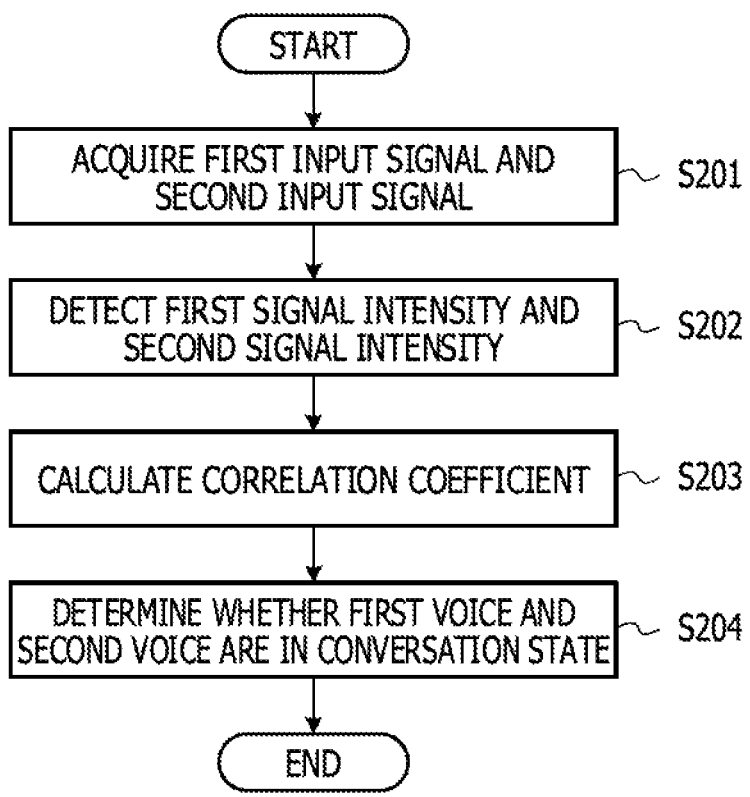
FIG. 2 is a flowchart illustrating a voice processing method of the voice processing apparatus.

FIG. 1 is a functional block diagram of a voice processing apparatus 1 of a first embodiment. The voice processing apparatus 1 includes an acquisition unit 2, a detecting unit 3, a calculating unit 4, and a determining unit 5. FIG. 2 is a flowchart illustrating a voice processing method of the voice processing apparatus 1. In accordance with Example 1, the voice processing flow of the voice processing apparatus 1 of FIG. 1 is described by referencing the function of each block of the functional block diagram of the voice processing apparatus 1 illustrated in FIG. 1.

The acquisition unit 2 of FIG. 1 is a wired-logic hardware circuit, for example. The acquisition unit 2 may be a function module that is implemented by a computer program executed by the voice processing apparatus 1. The acquisition unit 2 acquires a first voice of a first user, and a second voice of a second user, as an example of input voices, for example, via an external device. The process of the acquisition unit 2 corresponds to step S201 in a flowchart of FIG. 2. The acquisition unit 2 may use the method disclosed in Japanese Laid-open Patent Publication No. 2008-134557 as an acquisition method of a first input signal containing the first voice and a second input signal containing the second voice. Each of the first user and the second user may wear a microphone (not illustrated) corresponding to the external device. The first voice is spoken by the first user who speaks to a conversation partner (the second user or a user other than the second user). The second voice is spoken by the second user who speaks to a conversation partner (the first user or a user other than the first user). The first and second voices may be in Japanese, English, or any other language. In other words, the voice processing in Example 1 is not language-dependent. For convenience of explanation, in Example 1, the acquisition unit 2 acquires the first input signal containing the first voice of the first user and the second input signal containing the second voice of the second user. The acquisition unit 2 may acquire an x-th input signal containing an x-th voice of an x-th user other than the first and second users (x represents the number of users using the voice processing apparatus 1, for example). The acquisition unit 2 outputs the first voice and the second voice to the detecting unit 3.

The detecting unit 3 is a wired-logic hardware circuit, for example. The detecting unit 3 may be a function module that is implemented by the computer program executed by the voice processing apparatus 1. The detecting unit 3 receives the first input signal and the second input signal from the acquisition unit 2. The detecting unit 3 detects a first signal intensity or a second signal intensity from multiple frames contained in the first input signal or the second input signal. The process performed by the detecting unit 3 corresponds to step S202 of the flowchart of FIG. 2. More specifically, the detecting unit 3 detects the first signal intensity indicating a signal intensity of each of multiple frames contained in the first input signal. The detecting unit 3 also detects the second signal intensity indicating a signal intensity of each of multiple frames contained in the second voice. Each of the first signal intensity and the second signal intensity may include or but is not limited to power or a signal-to-noise ratio of the first voice or the second voice.

The detection process of the detecting unit 3 to detect power or the signal-to-noise ratio of the first input signal or the second input signal is described in detail below. For convenience of explanation, the power of the first voice is referred to as first power, the signal-to-noise ratio of the first voice is referred to as a first signal-to-noise ratio, the power of the second voice is referred to as second power, the signal-to-noise ratio of the second voice is referred to as a second signal-to-noise ratio. The detection method of the second power may be similar to the detection method of the first power. The detection method of the second signal-to-noise ratio may be similar to the detection method of the first signal-to-noise ratio. In the description of Example 1, the detection methods of the detecting unit 3 to detect the first power and the first signal-to-noise ratio are described in detail.

Figure 3:
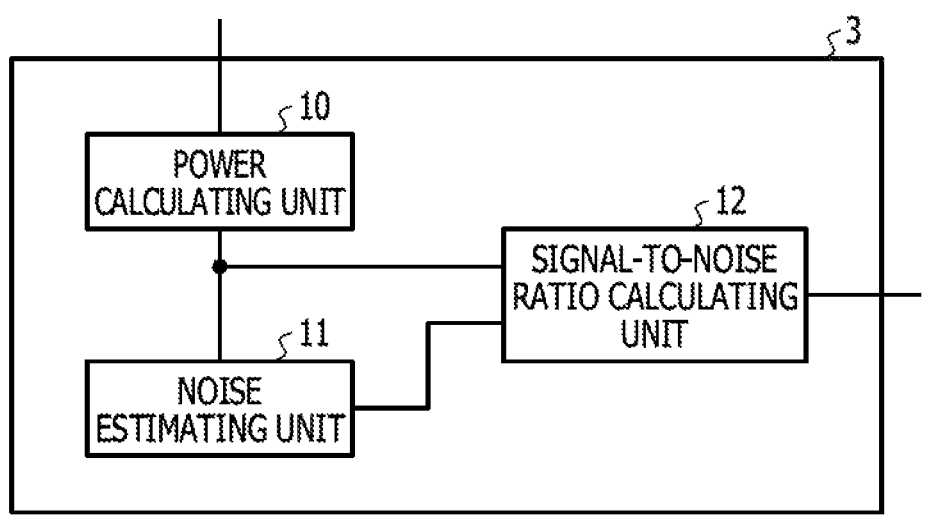
FIG. 3 is a functional block diagram of a detecting unit in accordance with an embodiment.

FIG. 3 is a functional block diagram of the detecting unit 3 in accordance with an embodiment. The detecting unit 3 includes a power calculating unit 10, a noise estimating unit 11, and a signal-to-noise ratio calculating unit 12. The detecting unit 3 does not necessarily have to include the power calculating unit 10, the noise estimating unit 11, and the signal-to-noise ratio calculating unit 12, and may be implemented by one or more wired-logic hardware circuits having the functions of the elements of the detecting unit 3. In place of the wired-logic hardware circuits having the functions of the elements of the detecting unit 3, the detecting unit 3 may be implemented by a function module of the computer program to be executed by the voice processing apparatus 1.

Power Calculation Method of Detecting Unit

Referring to FIG. 3, the power calculating unit 10 receives the first input signal. The power calculating unit 10 may include a buffer (not illustrated) or a cache (not illustrated). The power calculating unit 10 calculates the volume of each frame contained in the first input signal, and outputs the volume to the noise estimating unit 11 and the signal-to-noise ratio calculating unit 12. The length of each frame contained in the first input signal is 160 samples (corresponding to 20 ms with 8 kHz sampling). First power P1(t) as an example of the signal intensity of a first voice signal is calculated by performing logarithmic transformation on the sum of squared amplitudes within a frame of a first signal s1(t).

$$P1(t) = 10\log\left(\sum_{i=t}^{t+L} s_1^2(i)\right) \quad (1)$$

In formula (1), t represents a frame number, and L represents a frame length. As described above, the frame length L is 160 samples (corresponding to 20 ms with 8 kHz sampling).

Signal-to-Noise Ratio Calculation Method of Detecting Unit

The noise estimating unit 11 receives first power P1(t) of each frame from the power calculating unit 10. The noise estimating unit 11 estimates a noise in each frame and outputs noise estimation results to the signal-to-noise ratio calculating unit 12. The noise estimation of each frame of the noise estimating unit 11 is may be performed using a noise estimation method described below.

Noise Estimation Method

The noise estimating unit 11 updates first power in response to a difference between P1(t) of the first input signal and first noise power N1(t−1) of the immediately preceding frame in accordance with the following formula (2). If the difference between P1(t) of the first input signal and first noise power N1(t−1) of the immediately preceding frame is less than a predetermined threshold value (5 dB, for example), the noise estimating unit 11 updates first noise power N1(t) by estimating that the voice signal is noise. If the difference between P1(t) of the first input signal and first noise power N1(t−1) of the immediately preceding frame is equal to or above the predetermined threshold value, the noise estimating unit 11 determines the first noise power in accordance with the following formula (2) without updating.

$$N1(t) = \begin{cases} N1(t-1)*COF + P1(t)*(1-COF), & \text{(if } P1(t) - N1(t-1) < TH\_P) \\ N1(n-1), & \text{else } N1(n-1) \end{cases} \quad (2)$$

In formula (2), TH_P is a determination threshold value to determine a noise period, and may be 5 dB, for example. COF is a forgetting factor, and may be 0.05, for example. The noise estimating unit 11 receives the first noise power N1(t) of each frame serving as noise estimation results.

Referring to FIG. 3, the signal-to-noise ratio calculating unit 12 receives the first power P1(t) of each frame from the power calculating unit 10, and the first noise power N1(t) of each frame as the noise estimation results from the noise estimating unit 11. The signal-to-noise ratio calculating unit 12 includes a cache (not illustrated) or a memory (not illustrated), and stores the first power P1(t) and the first noise power N1(t) of past L frames. The signal-to-noise ratio calculating unit 12 calculates a first signal-to-noise ratio SNR1(t) in accordance with the formula:

$$SNR1(t) = P1(t) - N1(t) \quad (3)$$

Figure 4:
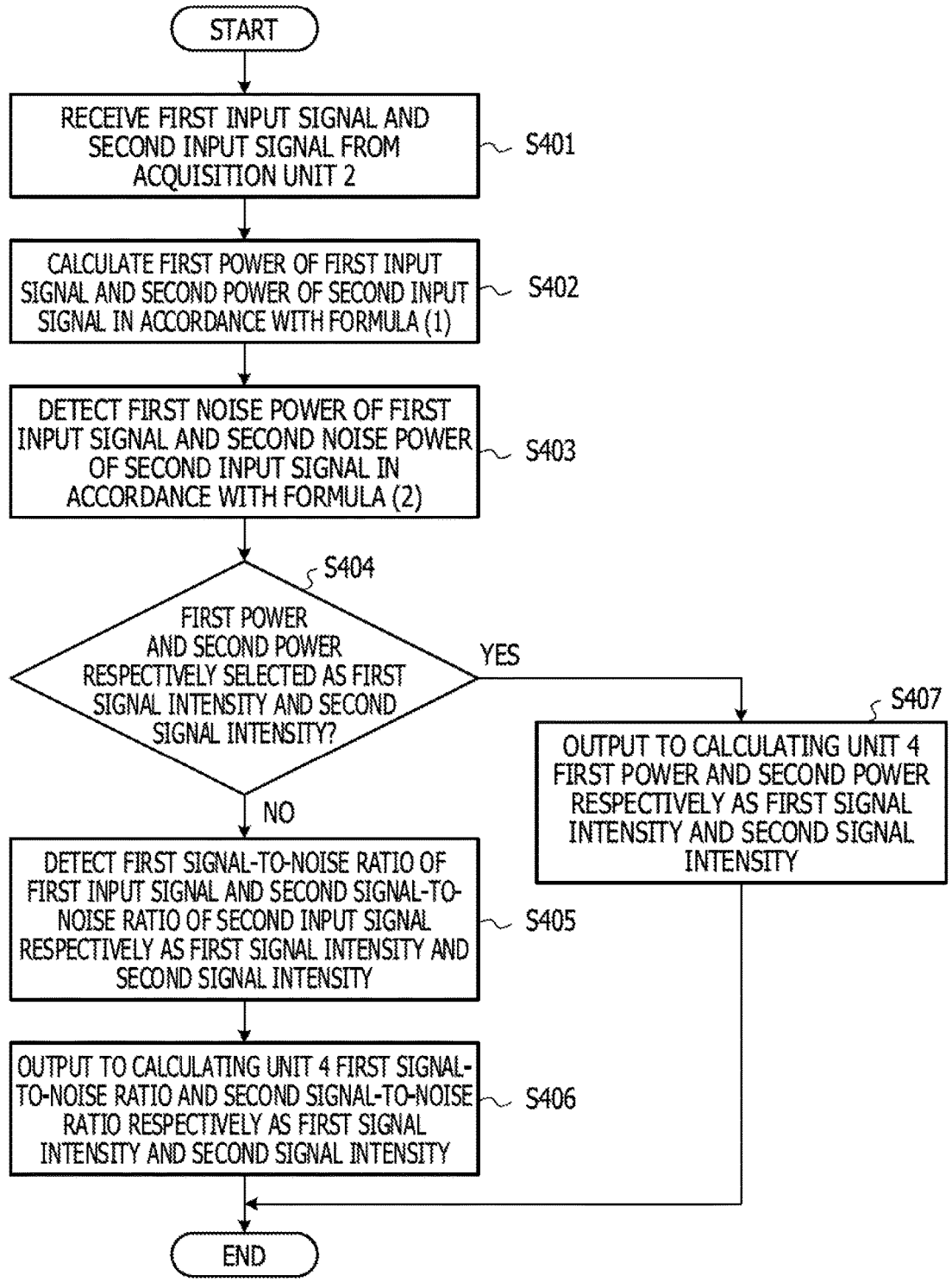
FIG. 4 is a flowchart illustrating a detection process of a detecting unit of Example 1.

FIG. 4 is a flowchart illustrating a detection process of the detecting unit 3 of Example 1. The detecting unit 3 receives the first input signal and the second input signal from the acquisition unit 2 (step S401). The detecting unit 3 calculates the first power of the first input signal and the second power of the second input signal in accordance with formula (1) (step S402). The detecting unit 3 detects the first noise power of the first voice and second noise power of the second voice in accordance with formula (2) (step S403). The detecting unit 3 determines whether to select the first power and the second power respectively as a first signal intensity and a second signal intensity (step S404). If the first noise power and the second noise power are respectively less than a specific threshold value, the first power and the second power are respectively selected as the first signal intensity and the second signal intensity. For example, if the detecting unit 3 determines that the first power and the second power are to be selected as the first signal intensity and the second signal intensity (yes branch from step S404), the first power and the second power are output as the first signal intensity and the second signal intensity to the calculating unit 4 (step S407). This ends the detection process of the flowchart of FIG. 4. On the other hand, if the detecting unit 3 does not determine that the first power and the second power are to be selected as the first signal intensity and the second signal intensity (no branch from step S404), the detecting unit 3 detects the first signal-to-noise ratio of the first voice and the second signal-to-noise ratio of the second voice in accordance with formula (3) (step S405). The detecting unit 3 outputs the first signal-to-noise ratio and the second signal-to-noise ratio as the first signal intensity and the second signal intensity to the calculating unit 4 (step S406). This ends the detection process of the flowchart of FIG. 4.

Figure 5A:
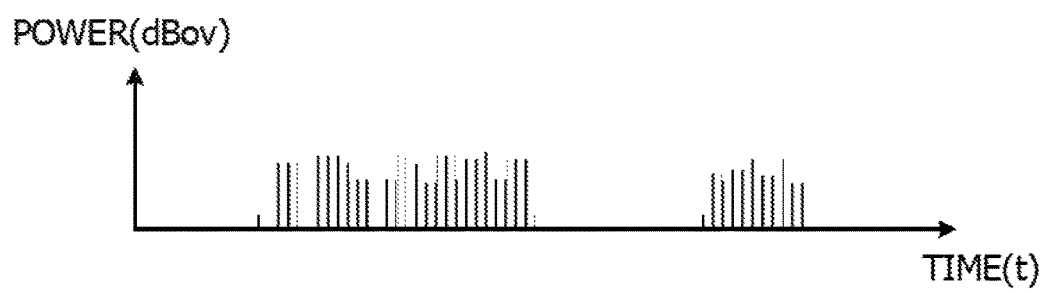
FIG. 5A illustrates first detection results of a first signal intensity by the detecting unit.
Figure 5B:
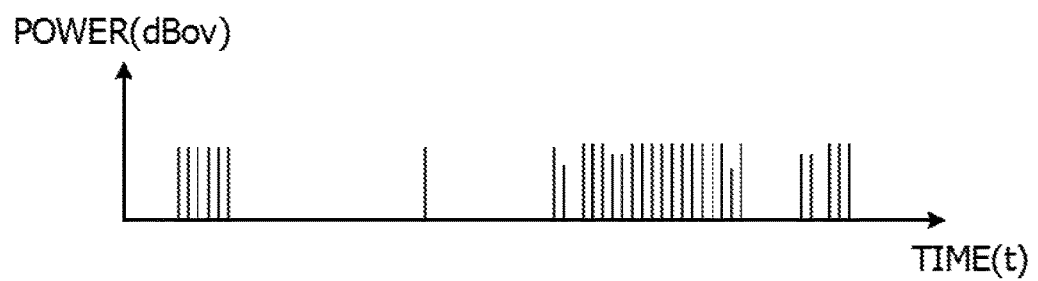
FIG. 5B illustrates a second signal intensity and second detection results of the second signal intensity by the detecting unit.

FIG. 5A illustrates first detection results of the first signal intensity provided by the detecting unit 3. In FIG. 5A, the abscissa represents time, and the ordinate represents the first power as an example of the first signal intensity. FIG. 5B illustrates the second signal intensity and second detection results of the second signal intensity provided by the detecting unit 3. In FIG. 5B, the abscissa represents time, and the ordinate represents the second power as an example of the second signal intensity. Note that power is plotted along the same ordinate scale in FIG. 5A and FIG. 5B and time is plotted along the same abscissa scale in FIG. 5A and FIG. 5B. The detecting unit 3 outputs to the calculating unit 4 the first signal intensity and second signal intensity thus detected.

Referring to FIG. 1, the calculating unit 4 may be a wired-logic hardware circuit, for example. The calculating unit 4 may be a function module that is implemented by a computer program to be executed by the voice processing apparatus 1. The calculating unit 4 receives the first signal intensity and the second signal intensity from the detecting unit 3. The calculating unit 4 calculates a correlation coefficient between the time sequence of the first signal intensity and the time sequence of the second signal intensity. This process of the calculating unit 4 corresponds to step S203 in the flowchart of FIG. 2. More specifically, the calculating unit 4 calculates the correlation coefficient corr between the time sequence of the first signal intensity and the time sequence of the third signal intensity in accordance with the following formula (4):

$$\text{corr.} = \frac{\sum_{i=Ts}^{Te} (P1'(i) - \overline{P1'(i)})(P2(i) - \overline{P2(i)})}{\sqrt{\sum_{i=Ts}^{Te} (P1'(i) - \overline{P1'(i)})^2} \sqrt{\sum_{i=Ts}^{Te} (P2(i) - \overline{P2(i)})^2}} \quad (4)$$

In formula (4), Ts represents a start time used to calculate the correlation coefficient, and Te represents an end time used to calculate the correlation coefficient. (Te−Ts) is a time period to calculate the correlation coefficient (may also be referred to as time sequence), and may be any time of length. For example, (Te−Ts) may be 60 seconds. The calculating unit 4 outputs to the determining unit 5 the calculated correlation coefficient between the time sequences of the first signal intensity and the second signal intensity.

The technical meaning why the calculating unit 4 calculates the correlation coefficient between the time sequences of the first signal intensity and the second signal intensity is described below. A comparative example the inventors have studied is described first below. Note that the comparative example is an idea that is not a related art technique but has been newly studied.

Comparative Example

Figure 6A:
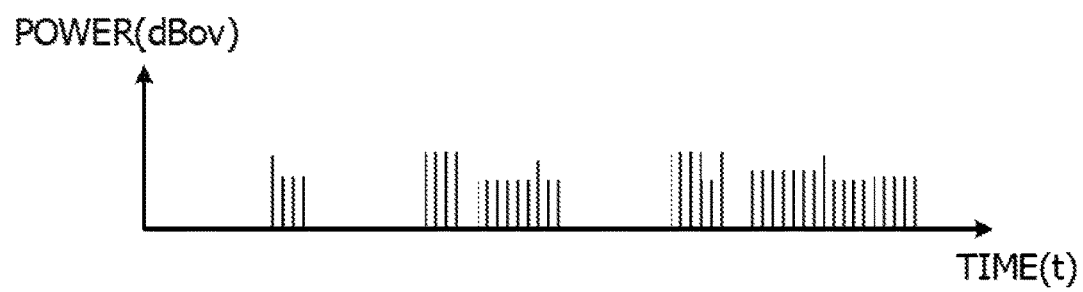
FIG. 6A illustrates reference detection results of the first signal intensity by the detecting unit.
Figure 6B:
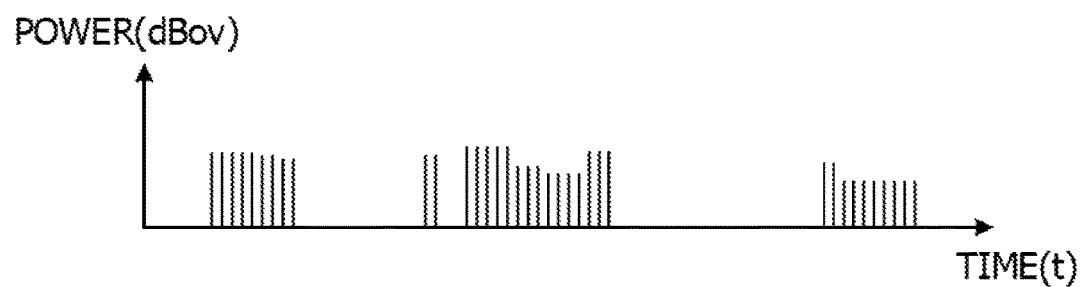
FIG. 6B illustrates the second signal intensity and reference detection results of the second signal intensity by the detecting unit.

In the comparative example, a combination of voice data of speakers in conversation is determined in accordance with a "ratio of speech time" of two pieces of voice data out of the voice data of voices that are individually recorded from multiple speakers. FIG. 6A illustrates reference detection results of the first signal intensity provided by the detecting unit 3. In FIG. 6A, the abscissa represent time, and the ordinate represents first power serving an example of the first signal intensity. FIG. 6B illustrates the second signal intensity and reference detection results of the second signal intensity provided by the detecting unit 3. In FIG. 6B, the abscissa represent time, and the ordinate represents second power serving an example of the second signal intensity. Note that power is plotted along the same ordinate scale in FIG. 6A and FIG. 6B and time is plotted along the same abscissa scale in FIG. 6A and FIG. 6B. A time period satisfying a signal intensity equal to or above any threshold value (10 dB, for example) is defined as the speech time. The ratio of speech time in FIG. 6A and FIG. 6B (the speech time of the first voice/the speech time of the second voice) is calculated, and the resulting ratio of speech time is 1.1. If the ratio of speech time in FIG. 5A and FIG. 5B is calculated in the same way as in FIG. 6A and FIG. 6B, the resulting ratio of speech time is 1.1.

In a natural conversation, speakers speak with each other for communication. In a time segment when one speaker speaks more, another speaker may speak less (listening to the first speaker). An objective comparison of a combination of FIG. 5A and FIG. 5B with a combination of FIG. 6A and FIG. 6B reveals that when one speaker speaks more, the other speaker speaks less in the combination of FIG. 5A and FIG. 5B. The combination of FIG. 6A and FIG. 6B reveals that when one speaker speaks more, the other speaker also speaks more, and thus suggests that the first user and the second user respectively converse with a third user.

Figure 7:
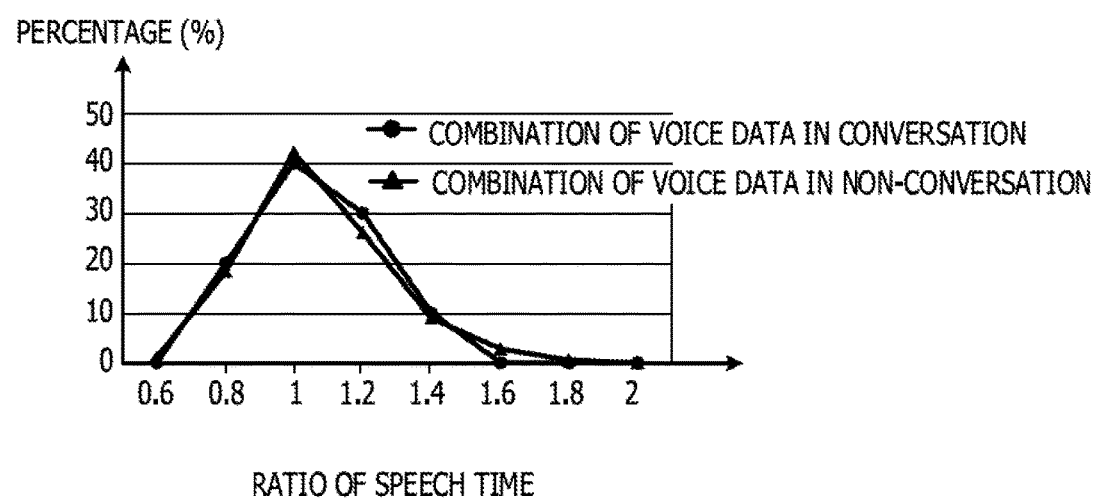
FIG. 7 illustrates a distribution map of rates of speech times.

FIG. 7 illustrates a distribution map of the ratio of speech times. FIG. 7 illustrates, among 190 combinations of voice data of 20 speakers, the distribution map of the ratios of speech times of 10 combinations of voice data participating in a conversation to 180 Combinations of voice data not participating in the conversation. As understood from the distribution map of the ratios of speech times of FIG. 7, the ratio of speech times of the combinations participating in the conversation is almost as high as the ratio of speech times of the combinations not participating in the conversation. For this reason, the inventors have found it difficult to determine the combinations of the voice data of speakers participating in the conversation from the voice data of voices that are individually recorded from multiple speakers in accordance with the "ratios of speech times" of the two pieces of voice data displayed in the comparative example.

As illustrated in FIGS. 5A and 5B, in the natural conversation, the speakers converse with each other for communication, and if one speaker speaks more, the other speaker is expected to speak less. Focusing on the correlation between the time sequences of the first signal intensity and the second signal intensity in FIG. 5A and FIG. 5B reveals a "negative correlation" that as one variable (such as the first signal intensity) increases, the other variable (such as the second signal intensity) decreases.

Figure 8:
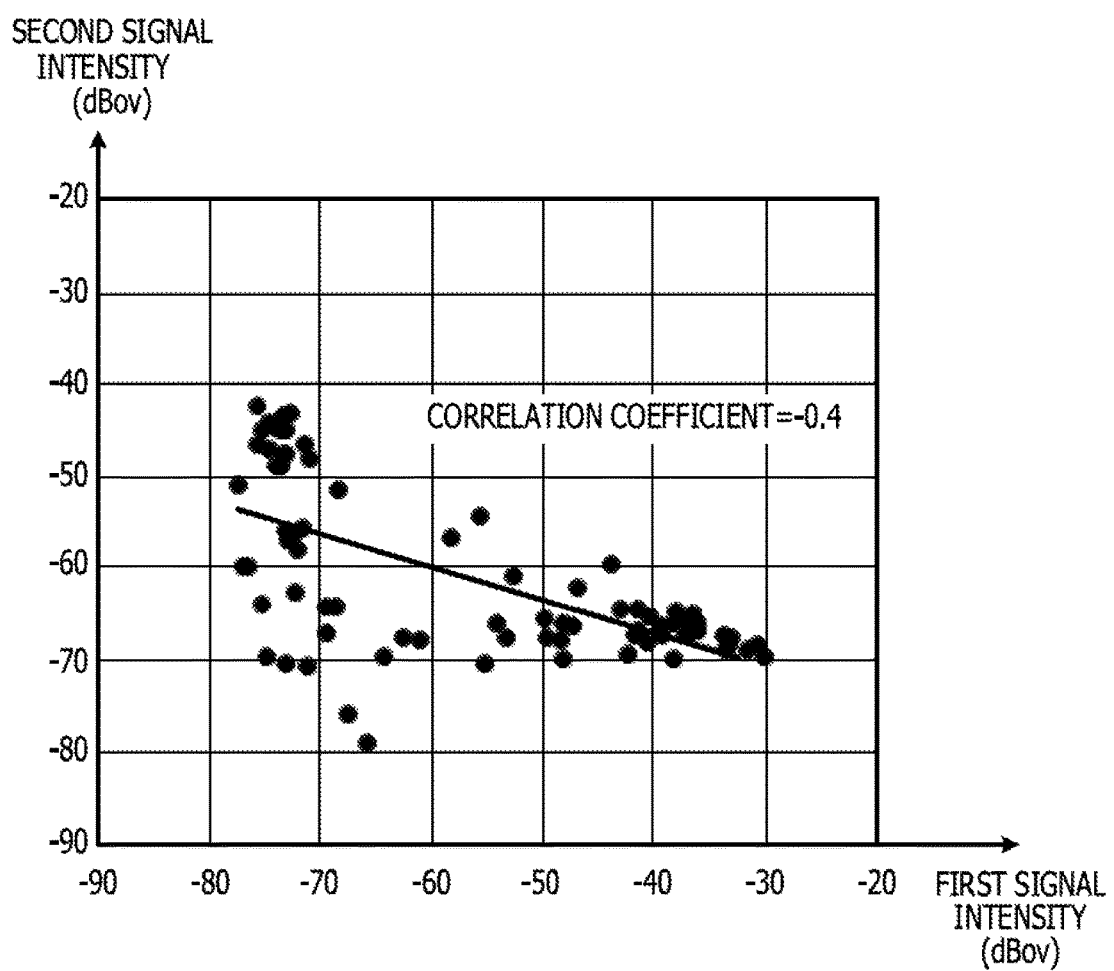
FIG. 8 illustrates a correlation between a time sequence of the first signal intensity and a time sequence of the second signal intensity when a first voice and a second voice are in a conversation state.

When the calculating unit 4 of Example 1 calculates the correlation coefficient indicating the magnitude of the negative correlation strength, the determining unit 5 discussed below determines whether the first voice and the second voice are in a conversation state. FIG. 8 illustrates a correlation between a time sequence of the first signal intensity and a time sequence of the second signal intensity when the first voice and the second voice are in a conversation state. As illustrated in FIG. 8, the correlation is negative (a negative correlation coefficient) when the first voice and the second voice are in the conversation state.

Figure 9:
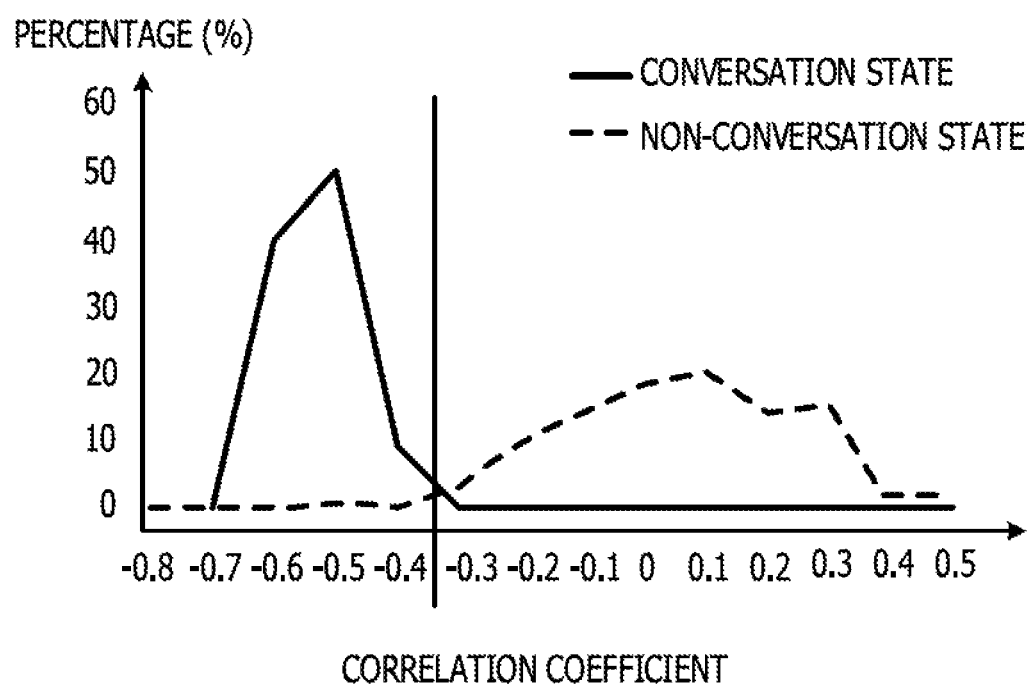
FIG. 9 illustrates a distribution map of the correlation coefficient between the time sequence of the first signal intensity and the time sequence of the second signal intensity.

FIG. 9 illustrates a distribution map of the correlation coefficient between the time sequence of the first signal intensity and the time sequence of the second signal intensity. Referring to FIG. 9, an evaluator uses 11 combinations of voice data of the first user and the second user (for a total of 31 minutes) to subjectively evaluate a conversation period and a non-conversation period (a period during which conversation is made with another person), and then calculates the correlation coefficient between the time sequences of the first signal intensity and the second signal intensity. As illustrated in FIG. 9, the range of the conversation period and the range of the non-conversation period are clearly differentiated. In view of experiment results of FIG. 9, a first threshold value having any value, for example, $-0.4$ here (typically, a value having intermediate correlation strength) may be determined. The first threshold value, and the correlation coefficient between the time sequences of the first signal intensity and the second signal intensity are thus used to determine whether the first voice and the second voice are in the conversation state or not.

As illustrated in FIG. 1, the determining unit 5 is a wired-logic hardware circuit, for example. The determining unit 5 may be a function module that is implemented by the computer program executed by the voice processing apparatus 1. The determining unit 5 receives from the calculating unit 4 the correlation coefficient between the time sequence of the first signal intensity and the time sequence of the second signal intensity, calculated by the calculating unit 4. Based on the correlation coefficient, the determining unit 5 determines whether the first voice and the second voice are in the conversation state. The process performed by the determining unit 5 corresponds to step S204 of the flowchart of FIG. 2. If the correlation coefficient is negative, and less than the first threshold value (for example, $-0.4>$the correlation coefficient$\geq-1.0$), the determining unit 5 may determine that the first voice and the second voice are in the conversation state. In other words, if the correlation coefficient is equal to or above the first threshold value (for example, $-0.4\leq$the correlation coefficient$\leq+1.0$), the determining unit 5 may determine that the first voice and the second voice are in the non-conversation state. The determining unit 5 outputs the determination results to any external device (such as a computer (not illustrated)).

The determining unit 5 receives, as appropriate, from the calculating unit 4 a period length (Te–Ts) in formula (4) which has been used to calculate the correlation coefficient, which is then used to determine that the first voice and the second voice are in the conversation state. The determining unit 5 may then output to the external device the period length (Te–Ts) as a time period throughout which the first user and the second user converse with each other. The determining unit 5 also receives, as appropriate, from the calculating unit 4 the start time Ts and the end time Te in formula 4 that have been used calculate the correlation coefficient, which is then used to determine that the first voice and the second voice are in the conversation state. The determining unit 5 may thus output to the external device Ts as a start time of the conversation of the first user and the second user, and Te as an end time of the conversation of the first user and the second user.

Figure 10:
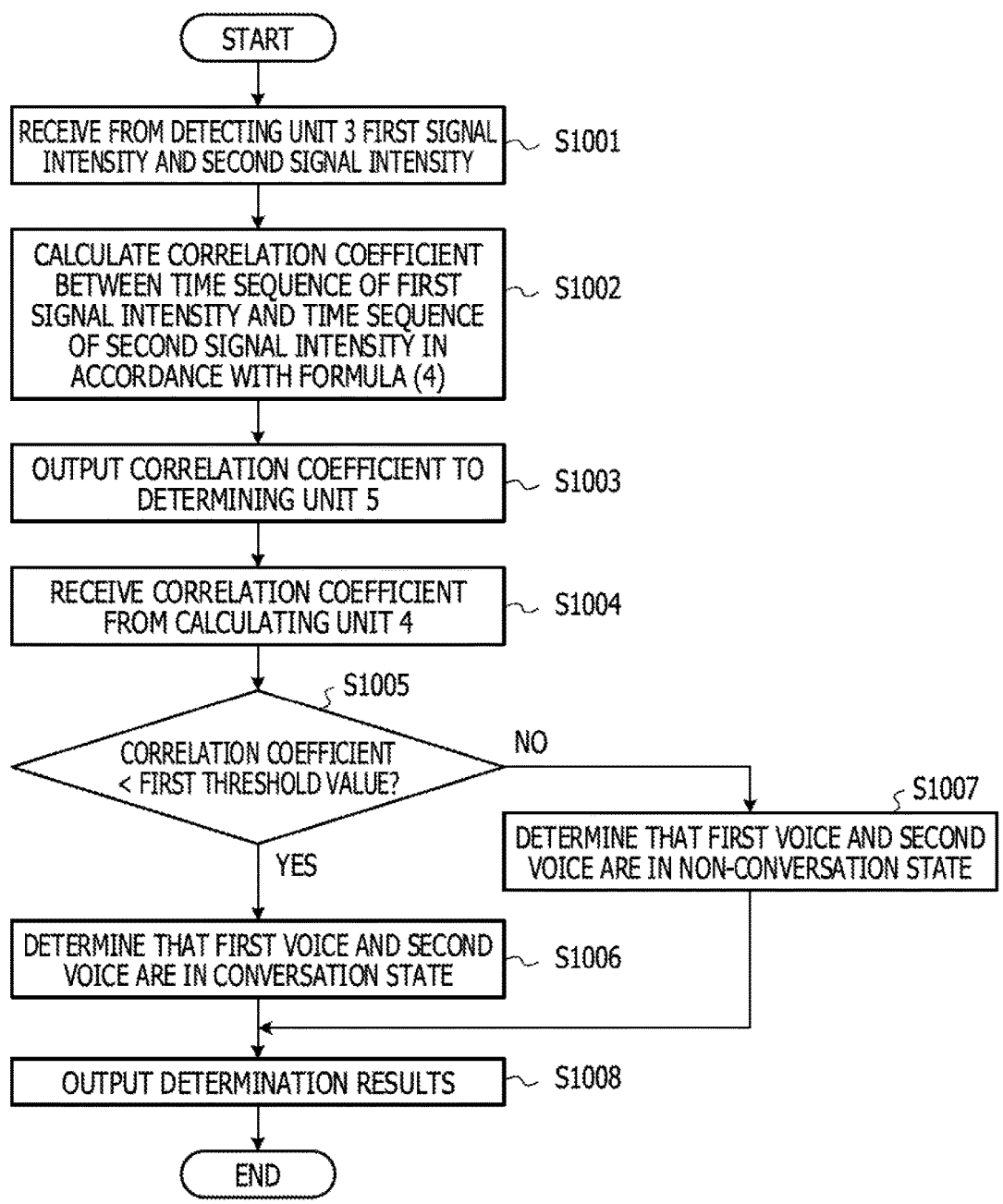
FIG. 10 is a flowchart illustrating a calculation process of a calculating unit and a determination process of a determining unit in accordance with Example 1.

FIG. 10 is a flowchart illustrating a calculation process of the calculating unit 4 and a determination process of the determining unit 5 in accordance with Example 1. The calculating unit 4 receives from the detecting unit 3 the first signal intensity and the second signal intensity (step S1001).

The calculating unit 4 calculates the correlation coefficient between the time sequences of the first signal intensity and the second signal intensity in accordance with formula (4) (step S1002). The calculating unit 4 outputs the calculated correlation coefficient to the determining unit 5 (step S1003). This ends the calculation process of the calculating unit 4 of the flowchart of FIG. 10.

The determining unit 5 receives from the calculating unit 4 the correlation coefficient calculated by the calculating unit 4 (step S1004). The determining unit 5 determines whether the correlation coefficient is less than the first threshold value (step S1005). If the correlation coefficient is less than the first threshold value (yes branch from step S1005), the determining unit 5 determines that the first voice and the second voice are in the conversation state (step S1006), and outputs the determination results to any external device (step S1008). This ends the determination process of the determining unit 5 illustrated in the flowchart of FIG. 10. If the correlation coefficient is equal to or above the first threshold value (no branch from step S1005), the determining unit 5 determines that the first voice and the second voice are in the non-conversation state (step S1007), and outputs the determination results to any external device (step S1008). This ends the determination process of the determining unit 5 illustrated in the flowchart of FIG. 10.

FIG. 11 illustrates determination performance of a combination of voice data in the conversation state, derived from voice data containing voices of multiple speakers in accordance with Example 1 and the comparative example. FIG. 11 illustrates a recall ratio of the voice data in conversation (rate at which a voice in the conversation state is detected) and a precision ratio (rate at which a detected voice is in the conversation state) in 190 combinations of the voice data of 20 speakers (a total of 10 combinations of the voice data in conversation and 180 combinations of the voice data not in conversation). In the comparative example, a combination of voice data having a speech time ratio of 1.2 or less is determined to be data in conversation to achieve a recall ratio of 100%. As illustrated in FIG. 11, Example 1 provides a significant improvement in comparison with the comparative example. Based on the characteristic that when one speaker speaks in conversation, the other speaker does not speak, the voice processing apparatus 1 of Example 1 may determine that users are in conversation if the correlation coefficient between the time sequences of signal intensities of different users is determined to be negative, and less than the first threshold value. In other words, the voice processing apparatus 1 of Example 1 may determine a combination of voice data of speakers in conversation at a higher accuracy level from the voice data of the voices that are individually recorded from multiple speakers.

Example 2

In addition to the detection process of Example 1, the detecting unit 3 of FIG. 1 may detect a magnitude relationship of the time sequences of the first signal intensity and the second signal intensity and detect a correlation coefficient calculation period during which the count of inversions at which the magnitude relationship is inverted is equal to or above a fourth threshold value (for example, the fourth threshold value is six times). In addition to the calculation process of Example 1, the calculating unit 4 of FIG. 1 may calculate the correlation coefficient during the correlation coefficient calculation period detected by the detecting unit 3 of Example 2. The voice processing process of the voice processing apparatus 1 of Example 2 is described in detail.

Figure 12:
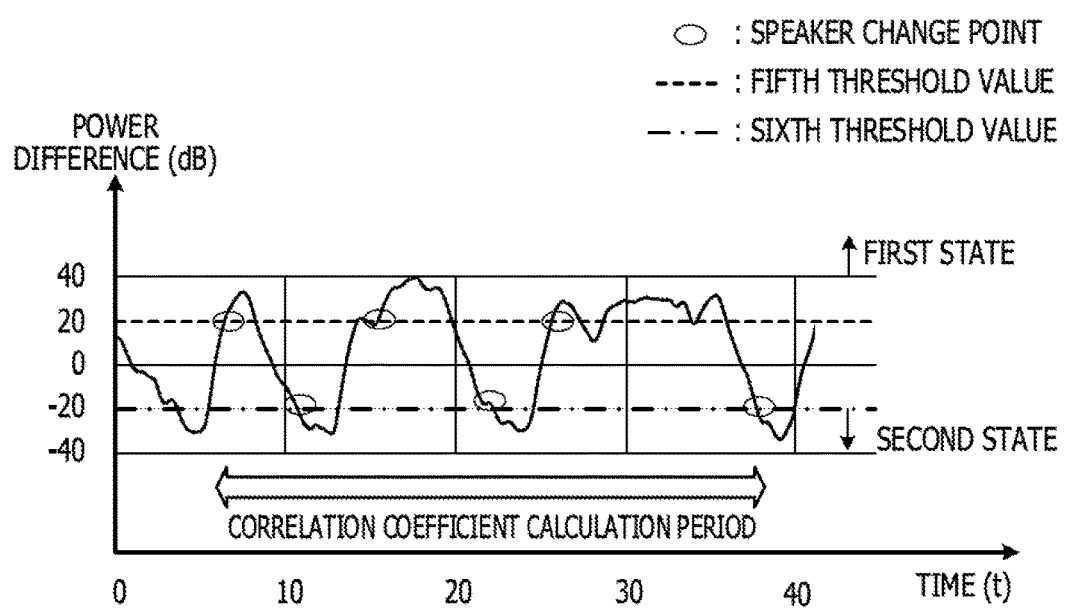
FIG. 12 illustrates a concept of a correlation coefficient calculation period.

The detecting unit 3 detects the magnitude relationship of the time sequences of the first signal intensity and the second signal intensity. More specifically, the detecting unit 3 detects a first state and a second state. In the first state, a difference between the first signal intensity and the second signal intensity (such as the first power and the second power) is equal to or above a fifth threshold value (for example, a power difference may be +20 dB). In the second state, a difference between the first signal intensity and the second signal intensity (such as the first power and the second power) is equal to or below a sixth threshold value (for example, a power difference may be −20 dB). If the first state is shifted to the second state, the detecting unit 3 detects a shift as a speaker change point (also referred to as an inversion point of the magnitude relationship between the time sequences of the first signal intensity and the second signal intensity). The detecting unit 3 detects the correlation coefficient calculation period within which the speaker change points become a fourth threshold value (the fourth threshold value may be six times). FIG. 12 illustrates a concept of the correlation coefficient calculation period. In FIG. 12, the abscissa represents the time sequence of the first voice or the second voice, and the ordinate represents the power difference that is an example of the power difference between the first signal intensity and the second signal intensity. The power difference in FIG. 12 indicates a power difference between power illustrated in FIG. 5A and power illustrated in FIG. 5B. The detecting unit 3 detects as the correlation coefficient calculation period a period within which the number of speaker change points is equal to or above the fourth threshold value. The detecting unit 3 outputs the correlation coefficient calculation period to the calculating unit 4.

The calculating unit 4 receives from the detecting unit 3 the correlation coefficient calculation period detected by the detecting unit 3. The calculating unit 4 calculates the correlation coefficient between the time sequences of the first signal intensity and the second signal intensity within the correlation coefficient calculation period in a similar way as in Example 1. The calculating unit 4 simply calculates the correlation coefficient between the time sequences of the first signal intensity and the second signal intensity during the correlation coefficient calculation period that is represented by (Te−Ts) where Ts is the start time of the correlation coefficient calculation period and Te is the end time of the correlation coefficient calculation period in formula (4). Upon receiving multiple correlation coefficient calculation periods from the detecting unit 3, the calculating unit 4 may simply calculate a correlation coefficient on each of the correlation coefficient calculation periods. The calculating unit 4 outputs the calculated correlation coefficient to the determining unit 5, and the determining unit 5 performs the determination process in a similar way as in Example 1. If the determining unit 5 receives multiple correlation coefficients from the calculating unit 4, the determining unit 5 performs the determination process on a per correlation coefficient basis in a similar way as in Example 1.

The technical meaning of Example 2 is described below. FIG. 13 illustrates a relationship between the speaker change count within in the correlation coefficient calculation period and the correlation coefficient calculated from the correlation coefficient calculation period in the conversation state or the non-conversation state. As illustrated in FIG. 13, within a period having a higher speaker change count (for example, the speaker change count is the fourth threshold value, such as six times), a (significant) difference appears between the correlation coefficient of a combination of voice data in conversation and the correlation coefficient of a combination of voice data not in conversation. For this reason, the voice processing apparatus 1 of Example 2 calculates the correlation coefficient during the correlation coefficient calculation period where the speaker change count is equal to or above the fourth threshold value, and thus determines the combination of the voice data of speakers in conversation with higher precision from the voice data of voices that are individually and accurately recorded from multiple speakers. Note that the voice processing apparatus 1 of Example 2 may include the voice processing processes of Example 1 in any combination.

Example 3

In addition to the calculation process of Example 1 or Example 2, the calculating unit 4 of FIG. 1 may calculate multiple correlation coefficients by varying a first phase of the first signal intensity or a second phase of the second signal intensity within a specific range. The determining unit 5 of FIG. 1 may determine whether the first voice and the second voice are in conversation, based on the correlation coefficient having a minimum value, from among the multiple correlation coefficients the calculating unit 4 has calculated by varying the first phase of the first signal intensity or the second phase of the second signal intensity within the specific range. The voice processing process of the voice processing apparatus 1 of Example 3 is described in detail below.

The calculating unit 4 calculates multiple correlation coefficients by varying the first phase of the first signal intensity or the second phase of the second signal intensity within the specific range. In the discussion of Example 3, the first phase is varied within the specific range. If the second phase is varied within the specific range, the correlation coefficient may be calculated in a similar fashion as the first phase is varied, and the detailed discussion of when the second phase is varied is omitted herein. In accordance with the following formula (5), the calculating unit 4 calculates a phase dmin satisfying the correlation coefficient having the minimum value, using multiple correlation coefficients between a first signal intensity P1(t) and a second signal intensity P2(t) with the first signal intensity (such as the first power P1) varied.

$$d\min = \operatorname*{argmin}_{d}\left\{\left|\frac{\sum_{i=Ts}^{Te}(P1(i)+d-\overline{P1(t)})(P2(i)-\overline{P2(t)})}{\sqrt{\sum_{i=Ts}^{Te}(P1(i)+d-\overline{P1(t)})^2}\sqrt{\sum_{i=Ts}^{Te}(P2(i)-\overline{P2(t)})^2}}\right|\right\} \quad (5)$$

$$d = -D\max, \ldots, D\max$$

$$\overline{P1(t)} = \frac{1}{Te-Ts+1}\sum_{i=Ts}^{Te}P1(i)$$

In formula (5), d represents an amount of change (sample) in phase, and Dmax represents a maximum value of the phase change. Dmax may be 80000 samples (corresponding to 10 seconds). The calculating unit 4 calculates a signal P1′t into which t the first signal intensity is shifted in phase by dmin as the specific range.

$$P1'(t)=P1(t+d\min) \quad (6)$$

The determining unit 5 determines whether the first voice and the second voice are in conversation, based on the correlation coefficient having a minimum value from among the multiple correlation coefficients, in a similar way as in Example 1.

Recording timings at which the acquisition unit 2 acquires the first input signal and the second input signal are not synchronized (for example, there is a difference between internal processes of voices of microphones worn by the first user and the second user, or the recording timings are not synchronized because of a gap in setting times). In such a case, the voice processing apparatus 1 of Example 3 increases determination accuracy of a combination of the voice data in conversation by adjusting the phases at the time point of calculating the correlation coefficient. Note that the voice processing apparatus 1 of Example 3 may include the voice processing processes in any combination described with reference to Example 1 or Example 2.

Example 4

In addition to the detection processes of Example 1 to Example 3, the detecting unit 3 of FIG. 1 may detect a first speech period contained in the first input signal in response to the first signal intensity, a second speech period contained in the second input signal in response to the second signal intensity, and a speech overlapping period where the first speech period overlaps the second speech period. In addition to the calculation processes of Example 1 to Example 3, the calculating unit 4 of FIG. 1 may perform a calculation process without using the first signal intensity and the second signal intensity having the speech overlapping period less than a second threshold value. The detecting unit 3 may detect a first silent period contained in the first input signal in response to the first signal intensity, a second silent period contained in the second input signal, and a silent overlapping period where the first silent period overlaps the second silent period. The calculating unit 4 may perform a calculation process without using the first signal intensity and the second signal intensity having the silent overlapping period less than a third threshold value. The voice processing process of the voice processing apparatus 1 of Example 4 is described in detail.

The detecting unit 3 determines whether the first signal intensity is equal to or above a threshold value (for example, 10 dB (if the first power is used as the first signal intensity)) on a frame-by-frame basis of a first signal. The detecting unit 3 determines a frame having the first signal intensity equal to or above the threshold value to be the first speech period. The detecting unit 3 determines a frame having the first signal intensity less than the threshold value to be the first silent period. In accordance with the following formulas (7), the detecting unit 3 determines whether each frame is the first speech period or the first silent period (also referred to as a non-speech period), thereby outputting determination results v1(t):

$v1(t)=1$ (first speech period)

$v1(t)=0$ (first silent period) $\quad (7)$

In formula (7), t represents a frame number. Note that the length of one frame is 20 ms, for example. If a first voice at a t-th frame is determined to be a speech period in formula (7), v1(t)=1 is substituted. If the first voice at the t-th frame is determined to be a silent period, v1(t)=0 is substituted. The detecting unit 3 outputs the frame periods consecutively satisfying v1(t)=1 as the first speech period. The detecting unit 3 calculates determination results v2(t) of a second voice in a similar way as with v1(t), and then detects a second speech period or a second silent period.

The detecting unit 3 detects a speech overlapping period where the first speech period and the second speech period overlap. The speech overlapping period is defined as a period when the first user and the second peak with each other at any given same point. More specifically, the detecting unit 3 detects the speech overlapping period TO(t) in accordance with the following formula (8):

$$\text{if } \{v_1(t) = 0\} \vee \{v_2(t) = 0\} \quad TO(t) = 0 \tag{8}$$
$$\text{else} \quad TO(t) = TO(t-1) + 1$$

In formula (8), in a frame of the first voice of the first user or the second voice of the second user determined to be a silent period, an overlapping period is defined to be zero (no overlapping period appears). In frames of the first voice of the first user and the second voice of the second user determined to be speech periods, one frame is added to multiple frames immediately prior to the frame. Consecutively overlapping frame counts (overlapping period) are thus calculated. The detecting unit 3 outputs the defined speech overlapping period to the calculating unit 4. The speech overlapping period includes information concerning the length of the period. The length of the speech overlapping period LO may be calculated in accordance with the following formula (9):

$$LO = TO\_e(i) - TO\_s(i) \tag{9}$$

In formula (9), TO_s(i) represents the start point of the speech overlapping period (start frame), and TO_e(i) represents the end point of the speech overlapping period (end frame).

The detecting unit 3 detects a silent overlapping period where the first silent period and the second silent period overlap each other. The silent overlapping period may be defined as a period throughout which the first user and the second user are not speaking with each other at any point of time. The detecting unit 3 detects a silent overlapping period TE(t) in accordance with the following formula (10):

$$\text{if } \begin{array}{l} \{v_1(t) = 1\} \vee \{v_2(t) = 1\} \text{ or } \{v_1(t) = 1\} \vee \{v_2(t) = 0\} \text{ or} \\ \{v_1(t) = 0\} \vee \{v_2(t) = 1\} TE(t) = 0 \end{array} \tag{10}$$
$$\text{else } TE(t) = TE(t-1) + 1$$

Formula (10) is intended to mean that an overlapping period is defined to be zero (no overlapping period appears) in a frame with the first voice of the first user and/or the second voice of the second user determined to be a speech period, and that consecutively overlapping frame counts (overlapping period) are thus calculated by adding one frame to multiple frames immediately prior to that frame whose first voice of the first user and second voice of the second user are determined to be silent periods. The detecting unit 3 outputs the defined silent overlapping period to the calculating unit 4. The silent overlapping period includes information concerning the length of the period. The length of the silent overlapping period LS may be calculated in accordance with the following formula (11):

$$LS = TS\_e(i) - TS\_s(i) \tag{11}$$

In formula (11), TS_s(i) represents the start point of the silent overlapping period (start frame), and TS_e(i) represents the end point of the silent overlapping period (end frame).

Process within Speech Overlapping Period

The calculating unit 4 may calculate the correlation coefficient in a calculation process that does not use the first signal intensity and the second signal intensity having a speech overlapping period in length less than the second threshold value (for example, the second threshold value=1 second (corresponding to 50 frames)). In other words, the calculating unit 4 performs the calculation process to calculate the correlation coefficient in a similar way as in Example 1, using a signal intensity other than the first signal intensity and the second signal intensity having the speech overlapping period less than the second threshold value. The speech overlapping period less than the second threshold value has a length of typical responses, such as "yes", "no", "yeah", "really?", "right". Responses occur in actual conversations. Possibly, while one speaker speaks, another speaker may concurrently speak (give a response). Since the first signal intensity and the second signal intensity having the speech overlapping period less than the second threshold value are not used to calculate the correlation coefficient, the effect of responses is thus excluded. For example, the first signal intensity and the second signal intensity having the speech overlapping period less than the second threshold value may now be used to calculate the correlation coefficient. Although the first user and the second user are in conversation, the correlation coefficient becomes closer to a positive value indicating that the correlation coefficient is in a non-conversation state. This is because each of the first signal intensity and the second signal intensity is at relatively high signal strength level.

Process within Silent Overlapping Period

The calculating unit 4 may calculate the correlation coefficient in the calculation process without using the first signal intensity and the second signal intensity having the length of the silent overlapping period being less than the third threshold value (the third threshold value=10 seconds (corresponding to 500 frames)). In other words, the calculating unit 4 performs the calculation process to calculate the correlation coefficient in a similar way as in Example 1, using a correlation coefficient other than the first signal intensity and the second signal intensity having the speech overlapping period less than the third threshold value. The length of the silent overlapping period less than the third threshold value is a silent period that is expected to occur in the conversation state. In an actual conversation, two persons may think what to speak about, and there may occur a silent period. The calculating unit 4 excludes the effect of the silent period by not using in the calculation of the correlation coefficient the first signal intensity and the second signal intensity having the length of the speech overlapping period thereof less than the third threshold value.

Figure 15:
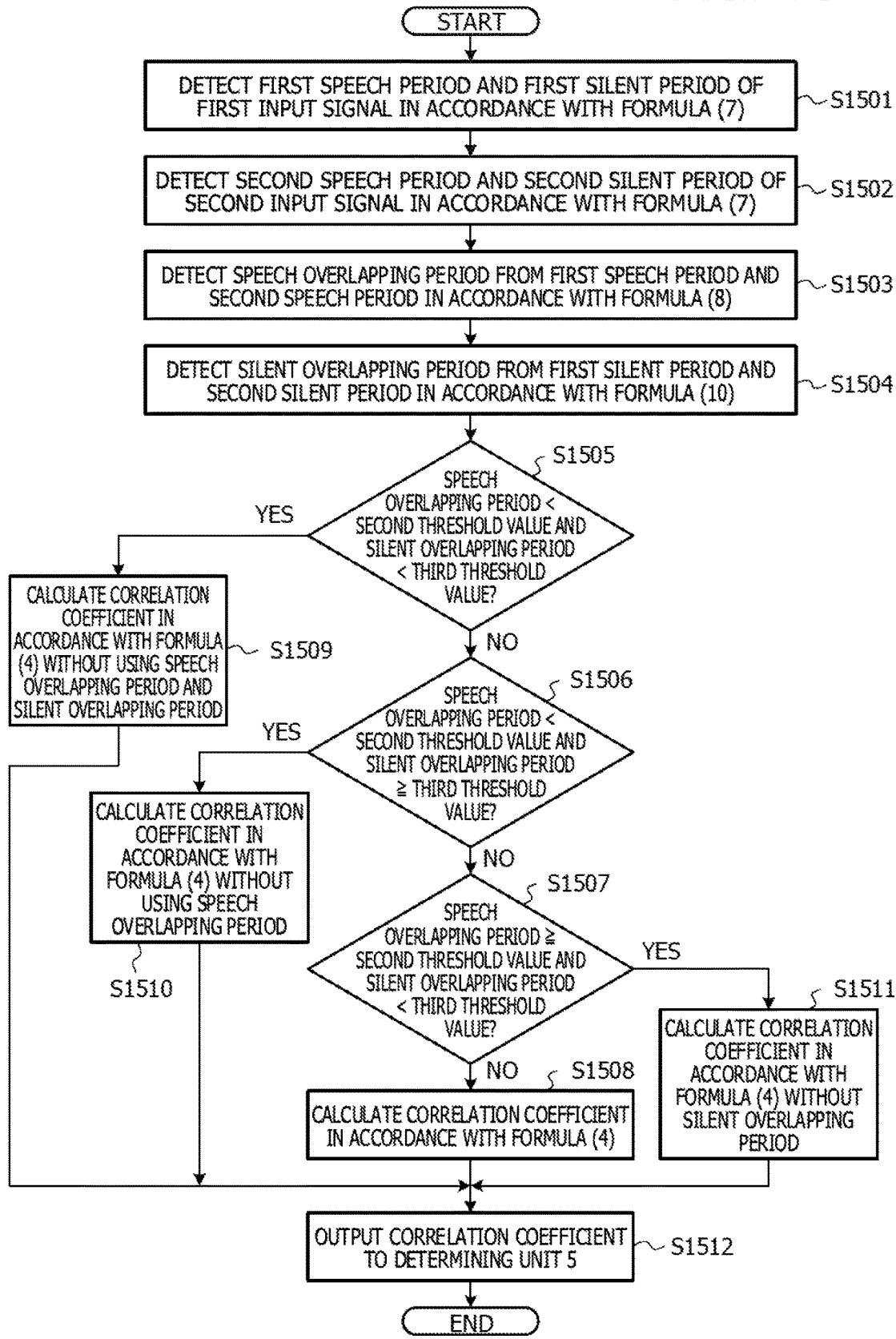
FIG. 15 is a flowchart illustrating a detection process of the detecting unit and a calculation process of the calculating unit in accordance with Example 4.

FIG. 15 is a flowchart illustrating a detection process of the detecting unit 3 and a calculation process of the calculating unit 4 in accordance with Example 4. The detecting unit 3 detects the first speech period of the first voice and the first silent period in accordance with formula (7) (step S1501). The detecting unit 3 detects the second speech period of the second voice and the second silent period in accordance with formula (7) (step S1502). The detecting unit 3 detects the speech overlapping period from the first speech period and the second speech period in accordance with formula (8) (step S1503). The detecting unit 3 detects the silent overlapping period from the first silent period and the second silent period in accordance with formula (10) (step S1504). The detecting unit 3 ends the detection process illustrated in the flowchart of FIG. 15 by outputting the detected speech overlapping period and silent overlapping period to the calculating unit 4.

The calculating unit 4 receives the speech overlapping period and the silent overlapping period from the detecting unit 3, and determines whether the speech overlapping period is less than the second threshold value and the silent overlapping period is less than the third threshold value (step S1505). If the speech overlapping period is less than the second threshold value and the silent overlapping period is less than the third threshold value (yes branch from step S1505), the calculating unit 4 calculates the correlation coefficient in accordance with formula (4) without using the speech overlapping period and the silent overlapping period (step S1509), and outputs the calculated correlation coefficient to the determining unit 5 (step S1512). This ends the calculation process illustrated in the flowchart of FIG. 15.

If the speech overlapping period is not less than the second threshold value and the silent overlapping period is not less than the third threshold value (no branch from step S1505), the calculating unit 4 determines whether the speech overlapping period is less than the second threshold value and the silent overlapping period is equal to or above the third threshold value (step S1506). If the speech overlapping period is less than the second threshold value and the silent overlapping period is equal to or above the third threshold value (yes branch from step S1506), the calculating unit 4 calculates the correlation coefficient in accordance with formula (4) without using the speech overlapping period (step S1510), and outputs the calculated correlation coefficient to the determining unit 5 (step S1512). This ends the calculation process illustrated in the flowchart of FIG. 15.

If the speech overlapping period is not less than the second threshold value and the silent overlapping period is less than the third threshold value (no branch from step S1506), the calculating unit 4 determines whether the speech overlapping period is equal to or above the second threshold value and the silent overlapping period is less than the third threshold value (step S1507). If the speech overlapping period is equal to or above the second threshold value and the silent overlapping period is less than the third threshold value (yes branch from step S1507), the calculating unit 4 calculates the correlation coefficient in accordance with formula (4) without using the silent overlapping period (step S1511), and then outputs the calculated correlation coefficient to the determining unit 5 (step S1512). This ends the calculation process illustrated in the flowchart of FIG. 15.

If the speech overlapping period is less than the second threshold value and the silent overlapping period is not less than the third threshold value (no branch from step S1507), the calculating unit 4 calculates the correlation coefficient in accordance with formula (4) in a similar way as in Example 1 (step S1508), and outputs the calculated correlation coefficient to the determining unit 5 (step S1512). This ends the calculation process illustrated in the flowchart of FIG. 15.

For convenience of explanation, the speech overlapping period and the silent overlapping period are process targets in Example 4. One or both of the speech overlapping period and the silent overlapping period may be a process target. The voice processing apparatus 1 of Example 4 may determine at a higher accuracy level a combination of voice data of speakers in conversation from the voice data of individually recorded voices of multiple speakers by accounting for the speech overlapping period or the silent overlapping period. The voice processing apparatus 1 of Example 4 may include voice processing processes of Example 1 to Example 3 in any combination.

Example 5

The acquisition unit 2 of FIG. 1 may acquire not only the first input signal containing the first voice of the first user or the first input signal containing the second voice of the second user, but also input signals (also referred to as an x-th input voice) containing voices of multiple users (also referred to as an x-th user). In accordance with Example 5, a determination method of determining a combination of two pieces of voice data in conversation from among combinations of multiple users is described below. For convenience of explanation, the acquisition unit 2 acquires via an external device a first voice of a first user through a fourth voice of a fourth user in Example 5. Each of the first through fourth users may wear a microphone (not illustrated and corresponding to the external device). The acquisition unit 2 outputs the acquired first through fourth voices to the detecting unit 3.

The detecting unit 3 of FIG. 1 receives from the acquisition unit 2 a first input voice through a fourth input voice. The detecting unit 3 detects the signal intensities of a first signal through a fourth signal (the first signal intensity, second signal intensity, third signal intensity, and fourth signal intensity) in the detection method described with reference to Example 1. The detecting unit 3 outputs the first signal intensity through the fourth signal intensity to the calculating unit 4.

The calculating unit 4 of FIG. 1 receives each signal intensity, namely, the first signal intensity through the fourth signal intensity from the detecting unit 3. The calculating unit 4 calculates the correlation coefficient of the time sequences when two signal intensities from among the signal intensities are combined. More specifically, the calculating unit 4 combines two signal intensities from among the first signal intensity through the fourth signal intensity. FIG. 14 illustrates a table of the correlation coefficients responsive to a combination of signal intensities. The calculating unit 4 stores the correlation coefficient table of FIG. 14 on a buffer (not illustrated) or a memory (not illustrated) in the calculating unit 4. The calculating unit 4 combines two signal intensities from among the first signal intensity through the fourth signal intensity with each combination associated with a combination ID of the voice data. The calculating unit 4 combines two signal intensities with the combination thereof associated with the combination ID as illustrated in FIG. 14, and calculates the correlation coefficient of the time sequences of the two signal intensities using the calculation method described with reference to Example 1, for example. The calculating unit 4 may list each correlation coefficient in the correlation coefficient table of FIG. 14. The calculating unit 4 outputs each calculated correlation coefficient to the determining unit 5.

The determining unit 5 of FIG. 1 receives from the calculating unit 4 the correlation coefficient of the time sequences of a combination of two signal intensities from among the first signal intensity through the fourth signal intensity. Based on the combination of the two signal intensities having the correlation coefficient with a minimum value, from among the correlation coefficients, the determining unit 5 determines a combination of users in conversation from among multiple users. Referencing the correlation coefficient table of FIG. 14, the second signal intensity and the third signal intensity corresponding to a combination ID 4 have a correlation coefficient with a minimum value.

The determining unit 5 thus determines that a combination of users in conversation is the second user and the third user. If the second signal intensity and the third signal intensity have the minimum value and the correlation coefficient of the time sequences of the second signal intensity and the third signal intensity is less than the first threshold value, the determining unit 5 determines that two combined pieces of voice data are in conversation.

Figure 16:
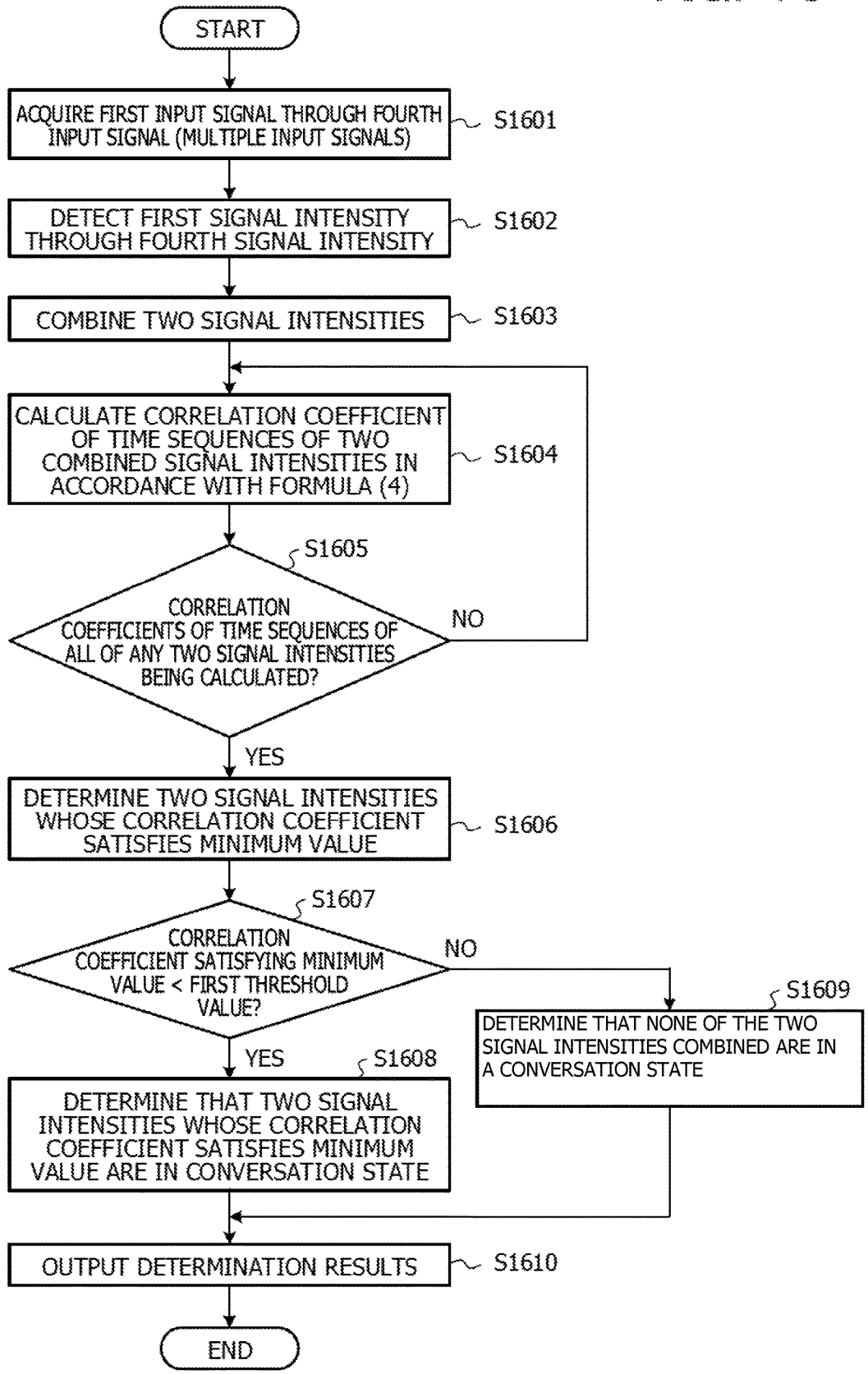
FIG. 16 is a flowchart illustrating a voice processing process of the voice processing apparatus in accordance with Example 5.

FIG. 16 is a flowchart illustrating a voice processing process of the voice processing apparatus 1 in accordance with Example 5. The acquisition unit 2 acquires the first voice through the fourth voice (also referred to as multiple voices) (step S1601). The detecting unit 3 detects the first signal intensity through the fourth signal intensity (step S1602). The detecting unit 3 combines two signal intensities from among the first signal intensity through the fourth signal intensity (step S1603). The calculating unit 4 calculates the correlation coefficient of the time sequences of the combination of two signal intensities in accordance with formula (4) (step S1604). The calculating unit 4 determines whether the correlation coefficients of the time sequences of all of combinations of any two signal intensities have been calculated (step S1605). If the correlation coefficients of the time sequences of all of combinations of any two signal intensities have not been calculated (no branch from step S1605), operations in step S1604 and step S1605 are repeated. If the correlation coefficients of the time sequences of all of combinations of any two signal intensities have been calculated (yes branch from step S1605), the calculating unit 4 determines the two signal intensities with the correlation coefficient having a minimum value (step S1606).

The determining unit 5 determines whether the correlation coefficient having a minimum value is less than the first threshold value (step S1607). If the correlation coefficient having the minimum value is less than the first threshold value (yes branch from step S1607), the determining unit 5 determines the two signal intensities whose correlation coefficient has the minimum value are in a conversation state (step S1608), and outputs the determination results to any external device (step S1610). The voice processing apparatus 1 thus ends the voice process illustrated in the flowchart of FIG. 16. If the correlation coefficient is equal to or above the first threshold value (no branch from step S1607), the determining unit 5 determines that no combination of two signal intensities is in the conversation state (step S1609), and outputs the determination results to the external device (step S1610). The voice processing apparatus 1 ends the voice processing process illustrated in the flowchart of FIG. 16.

The voice processing apparatus 1 of Example 5 determines a combination of voice data responsive to speakers in conversation from the voice data of voices individually recorded from multiple speakers, based on a combination of two signal intensities whose correlation coefficient has a minimum value. The voice processing apparatus 1 thus determines the combination of voice data responsive to the speakers in conversation with higher accuracy. The voice processing apparatus 1 of Example 5 may include voice processing processes in Example 1 to Example 4 in any combination.

Example 6

The voice processing apparatus 1 of Example 6 may identify a group of three or more persons in conversation. For example, the number of persons in conversation is not limited to two in a workplace, and three or more persons may sometimes participate in conversation. In the discussion that follows, the voice processing process of the voice processing apparatus 1 that identifies a group of three or more persons in conversation is described in detail. The processes of the acquisition unit 2 and the detecting unit 3 and part of the process of the calculating unit 4 in Example 6 are identical to those in Example 5, and the detailed discussion thereof is omitted herein.

The determining unit 5 of FIG. 1 receives from the calculating unit 4 the correlation coefficient of the time sequences of two signal intensities that are combined from among the first signal intensity through the fourth signal intensity. In a similar way as in Example 5, the determining unit 5 determines a combination of signal intensities of users in conversation from among multiple users, based on a combination of two signal intensities whose correlation coefficient has a minimum value from among the correlation coefficients. For example, referring to the correlation coefficient table of FIG. 14, the second signal intensity and the third signal intensity associated with the combination ID 4 are a combination whose correlation coefficient is a minimum value. The calculating unit 4 then calculates an addition signal intensity that is a sum of the two signal intensities used in the calculation of the correlation coefficient having a minimum value. More specifically, the calculating unit 4 calculates an addition signal intensity Padd(t) that is a sum of the second signal intensity P2(t) and the third signal intensity P3(t), in accordance with the following formulas (a resulting value of formula (12) or a resulting value of formula (13) or a mean value of both formulas (12) and (13) may be used):

$$P\_ADD_n(t) = \sum_i P_i(t) \mid i \in G_n \qquad (12)$$

$$P\_ADD_n(t) = \max_i P_i(t) \mid i \in G_n \qquad (13)$$

In formulas (12) and (13), n corresponds to an x-th user. Formula (12) represents the sum of signal intensities, and formula (13) represents the maximum value of the signal intensities. Gn represents a group. For example, the first signal and the second signal included in a group are represented as Gn={1, 2}. The second signal and the third signal included in a group are represented as Gn={2, 3}.

The calculating unit 4 calculates a reference correlation coefficient of the time sequences of the addition signal intensity and one signal intensity (the first signal intensity or the fourth signal intensity) other than two signal intensities (for example, other than the second signal intensity and the third signal intensity) that are used to calculate the correlation coefficient having a minimum value. For convenience of explanation in Example 6, the reference correlation coefficient $corr_n$ of the time sequences of the addition signal intensity and the fourth signal intensity of the fourth user is calculated in accordance with formula (14):

$$corr_n = \frac{\sum_{i=Ts}^{Te} (P1(i) - \overline{P1(i)})(P\_ADDn(i) - \overline{P\_ADD(i)})}{\sqrt{\sum_{i=Ts}^{Te} (P1(i) - \overline{P1(i)})^2} \sqrt{\sum_{i=Ts}^{Te} (P\_ADD(i) - \overline{P\_ADD(i)})^2}} \qquad (14)$$

In Example 6, P1(i) is the fourth signal intensity, and Padd(t) is the addition signal intensity in formula (14). If the silent overlapping period of the two signal intensities used to calculate the correlation coefficient having a minimum value is equal to or above the fifth threshold value (for example, the silent overlapping period=10 seconds), the calculating unit 4 may calculate the reference correlation coefficient. The calculating unit 4 outputs to the determining unit 5 the reference correlation coefficient and the correlation coefficient having a minimum value from among combinations of two signal intensities. The determining unit 5 receives the reference correlation coefficient and the correlation coefficient.

The determining unit 5 receives from the calculating unit 4 the reference correlation coefficient and the correlation coefficient having a minimum value from among the combinations of any two signal intensities. If the reference correlation coefficient is less than the correlation coefficient having the minimum value or the reference correlation coefficient is less than the first threshold value, the determining unit 5 may determine a combination of three persons in conversation (the combination may be referred to as a group in conversation), based on the three signal intensities used to calculate the reference correlation coefficient. For example, if the reference correlation coefficient is less than the correlation coefficient having the minimum value, the determining unit 5 determines that the second user, the third user, and the fourth user are in conversation as a group of three persons. If the reference correlation coefficient is less than the correlation coefficient having the minimum value and less than the first threshold value, the determining unit 5 may determine that the second user, the third user, and the fourth user are in conversation as a group of three persons. Even if the reference correlation coefficient is equal to or above the correlation coefficient having the minimum value, but less than the first threshold value, the determining unit 5 may still determine that the second user, the third user, and the fourth user are in conversation as a group of three persons. If the fourth voice is included in group Gn={2, 3} in formula (12) and formula (13) (the second signal and the third signal are included in the group), a new group may be simply defined as Gn+1=GnU{3}={2, 3, 4}.

After determining that the second, third, and fourth users are in conversation as a group of three persons, the determining unit 5 may determine whether a group of four persons including the first user is in conversation by performing the following process. The calculating unit 4 substitutes the reference correlation coefficient calculated from the second signal intensity, the third signal intensity, and the fourth signal intensity for the correlation coefficient having the minimum value. The calculating unit 4 then calculates the addition signal intensity of the first signal intensity, the second signal intensity, and the third signal intensity in accordance with formula (12) or formula (13). The calculating unit 4 calculates the reference correlation coefficient of the time sequences of the first signal intensity and the addition signal intensity. The process of the determining unit 5 may be similar to the determination method described with reference to Example 6. The determining unit 5 may determine multiple users (group) in conversation by performing the above-described process to all the signal intensities.

Figure 17A:
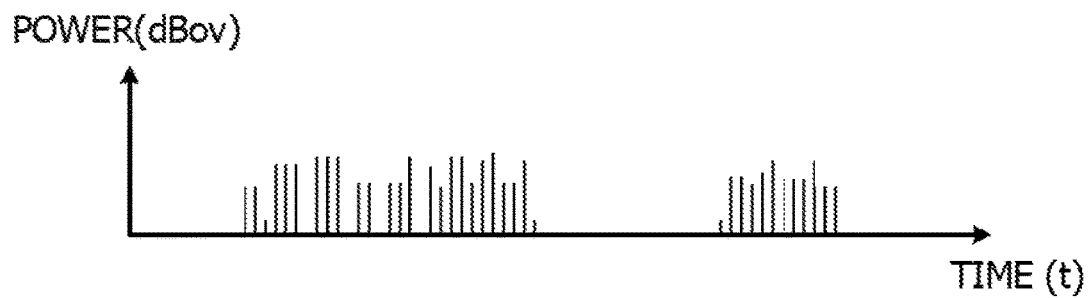
FIG. 17A illustrates second detection results of the second signal intensity by the detecting unit.
Figure 17B:
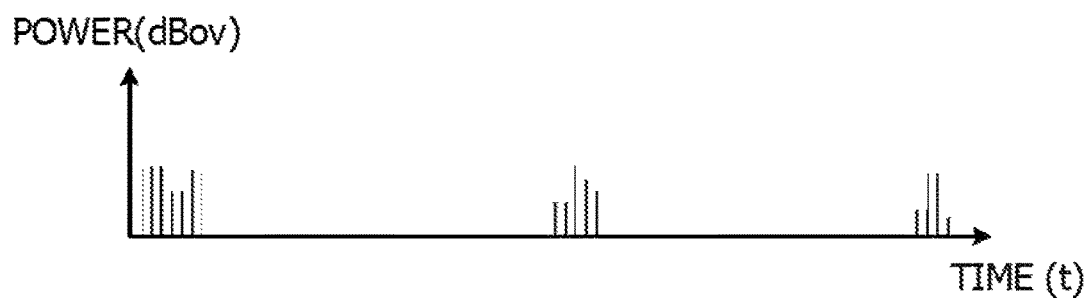
FIG. 17B illustrates third detection results of a third signal intensity by the detecting unit.
Figure 17C:
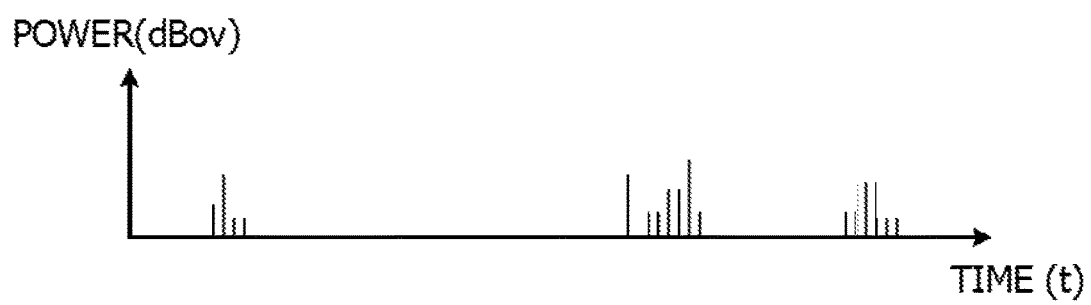
FIG. 17C illustrates fourth detection results of a fourth signal intensity by the detecting unit.

The technical meaning of Example 6 is described below. FIG. 17A illustrates second detection results of the second signal intensity by the detecting unit 3. In FIG. 17A, the abscissa represents time, and the ordinate represents second power as an example of the second signal intensity. FIG. 17B illustrates third detection results of the third signal intensity by the detecting unit 3. In FIG. 17B, the abscissa represents time, and the ordinate represents third power as an example of the third signal intensity. FIG. 17C illustrates fourth detection results of the fourth signal intensity by the detecting unit 3. In FIG. 17C, the abscissa represents time, and the ordinate represents fourth power as an example of the fourth signal intensity. Note that power is plotted along the same ordinate scale in FIG. 17A through FIG. 17C and time is plotted along the same abscissa scale in FIG. 17A through FIG. 17C.

With two speakers participating in a natural conversation, they alternately speak for communication. As previously described with reference to Example 1, it is likely that while one speaker speaks more, the other speaker speaks less. With three speakers participating and speaking in turn in conversation, it is likely that while one speaker speaks, the remaining two speakers speak less. By calculating the correlation coefficient of the signal intensities of the voices of the three persons, a combination of users in conversation may be determined with a higher accuracy level. Referring to FIG. 17A through FIG. 17C, for example, there are time segments when the second signal intensity and the third signal intensity are zero (corresponding to the silent overlapping period). If the first signal intensity is above zero during these time segments, the reference correlation coefficient is less than the correlation coefficient between the second signal intensity and the third signal intensity. If the silent overlapping period between the second signal intensity and the third signal intensity is equal to or above the fifth threshold value (the silent overlapping period=10 seconds, for example) (in other words, the first signal intensity is likely to be above zero), the calculation of the reference correlation coefficient may be performed. This calculation process leads to reducing the workload on the calculation process of the calculating unit 4. During the silent overlapping period, a signal intensity of a voice containing the largest number of frames at a higher signal intensity level may be selected with a higher priority as a signal intensity to calculate the reference correlation coefficient.

With higher accuracy, the voice processing apparatus 1 of Example 6 may determine a combination of voice data responsive to speakers in conversation from voice data of voices that are recorded individually from multiple speakers. The voice processing apparatus 1 of Example 6 may include voice processing processes of Example 1 to Example 5 in any combination.

Example 7

In addition to the detection processes of Example 1 to Example 6, the detecting unit 3 of FIG. 1 may detect the second signal intensity contained in the first input signal or the first signal intensity contained in the second input signal. In addition to the calculation processes of Example 1 to Example 6, the calculating unit 4 may calculate a second correlation coefficient of the time sequences of the second signal intensity contained in the first input signal and the second signal intensity contained in the second input signal or of the time sequences of the first signal intensity contained in the second input signal and the first signal intensity contained in the first input signal. In addition to the determination processes of Example 1 to Example 6, the determining unit 5 may determine in accordance with the second correlation coefficient whether the first voice and the second voice are in conversation. The voice processing process of the voice processing apparatus 1 of Example 7 is described in detail below.

If the first user and the second user talk face to face in a conference or in a chat, they are relatively close to each other in distance. The microphone worn by the first user may pick up not only the voice of the first user but also the voice of the second user. Similarly, the microphone worn by the second user may pick up not only the voice of the second user but also the voice of the first user. In accordance with Example 7, the first signal the detecting unit 3 receives from the acquisition unit 2 may contain the second signal, and the second signal may contain the first signal. For convenience of explanation, the period of the second signal contained in the first signal, and the period of the first signal contained in the second signal may be referred to as a sneak period.

The detecting unit 3 separates the second signal contained in the first signal from the first signal. More specifically, the detecting unit 3 calculates the correlation coefficient $corr_n$ between the first intensity P1(t) as an example of the first signal intensity of the first voice and the second power P2(t) as an example of the second signal intensity of the second voice at a time segment between specific time intervals (for example, every second) in accordance with the following formula (15). If the correlation coefficient is determined to be higher, the time segment is determined to be the sneak period.

$$corr_n = \frac{\sum_{i=Tn-1}^{Tn}(P1(i) - \overline{P1(t)})(P2(i) - \overline{P2(t)})}{\sqrt{\sum_{i=Tn-1}^{Tn}(P1(i) - \overline{P1(t)})^2}\sqrt{\sum_{i=Tn-1}^{Tn}(P2(i) - \overline{P2(t)})^2}} \quad (15)$$

if $corr_n$>TH_SNEAK: sneak period (shorter period is sneak period in the comparison of sneak periods P1(t) and P2(t))

else: not sneak period

In formula 15, Tn represents a frame length of a correlation calculation range (for example, 1 frame=20 ms). In the case of 1 second, T_n=n*50. The determination value of the sneak period TH_SNEAK may be 0.95. The detecting unit 3 also may separate the first signal contained in the second signal from the second signal in accordance with formula (15). The detecting unit 3 outputs to the calculating unit 4 the second signal contained in the first signal and separated from the first signal or the first signal contained in the second signal and separated from the second signal. For convenience of explanation, the second signal contained in the first signal and separated from the first signal is referred to as a "second separate signal", and the first signal contained in the second signal and separated from the second signal is referred to as a "first separate signal". The detecting unit 3 outputs the first separate signal and the second separate signal to the calculating unit 4.

The calculating unit 4 receives the first separate signal and the second separate signal from the detecting unit 3. The calculating unit 4 calculates a second correlation coefficient of time sequences of the signal intensity of the first separate signal and the first signal intensity or of time sequences of the signal intensity of the second separate signal and the second signal intensity in accordance with formula (4). The calculating unit 4 outputs the calculated second correlation coefficient to the determining unit 5. The technical meaning why the calculating unit 4 calculates the second correlation coefficient is described below. The second correlation coefficient of the time sequences of the signal intensity of the first separate signal and the first signal intensity is now considered. Since the first separate signal and the first signal come in from different microphones, both signals are different in signal intensity, but are originated from the first user. If the first signal has some intensity, the first separate signal has also some intensity. For this reason, the second correlation coefficient of the time sequences of the signal intensity of the first separate signal and the first signal intensity is positive. When the calculating unit 4 calculates the second correlation coefficient having a positive correlation, the determining unit 5 determines in accordance with the second correlation coefficient whether the first voice and the second voice are in conversation.

The determining unit 5 receives the second correlation coefficient from the calculating unit 4. The determining unit 5 determines in accordance with the second correlation coefficient whether the first voice and the second voice are in conversation. For example, if the second correlation coefficient is positive, and equal to above the sixth threshold value (for example, the six threshold value=+0.4), the determining unit 5 determines that the first voice and the second voice are in conversation. If the second correlation coefficient is equal to or above the sixth threshold value and the correlation coefficient is less than the first threshold value, the determining unit 5 may determine that the first voice and the second voice are in conversation.

The voice processing apparatus 1 of Example 7 determines in accordance with the second correlation coefficient a combination of voice data responsive to speakers in conversation from voice data of voices that are individually recorded from multiple speakers. The voice processing apparatus 1 of Example 7 may thus determine the combination of the voice data in conversation with higher accuracy. The voice processing apparatus 1 of Example 7 may include voice processing processes of Example 1 to Example 6 in any combination.

Example 8

Figure 18:
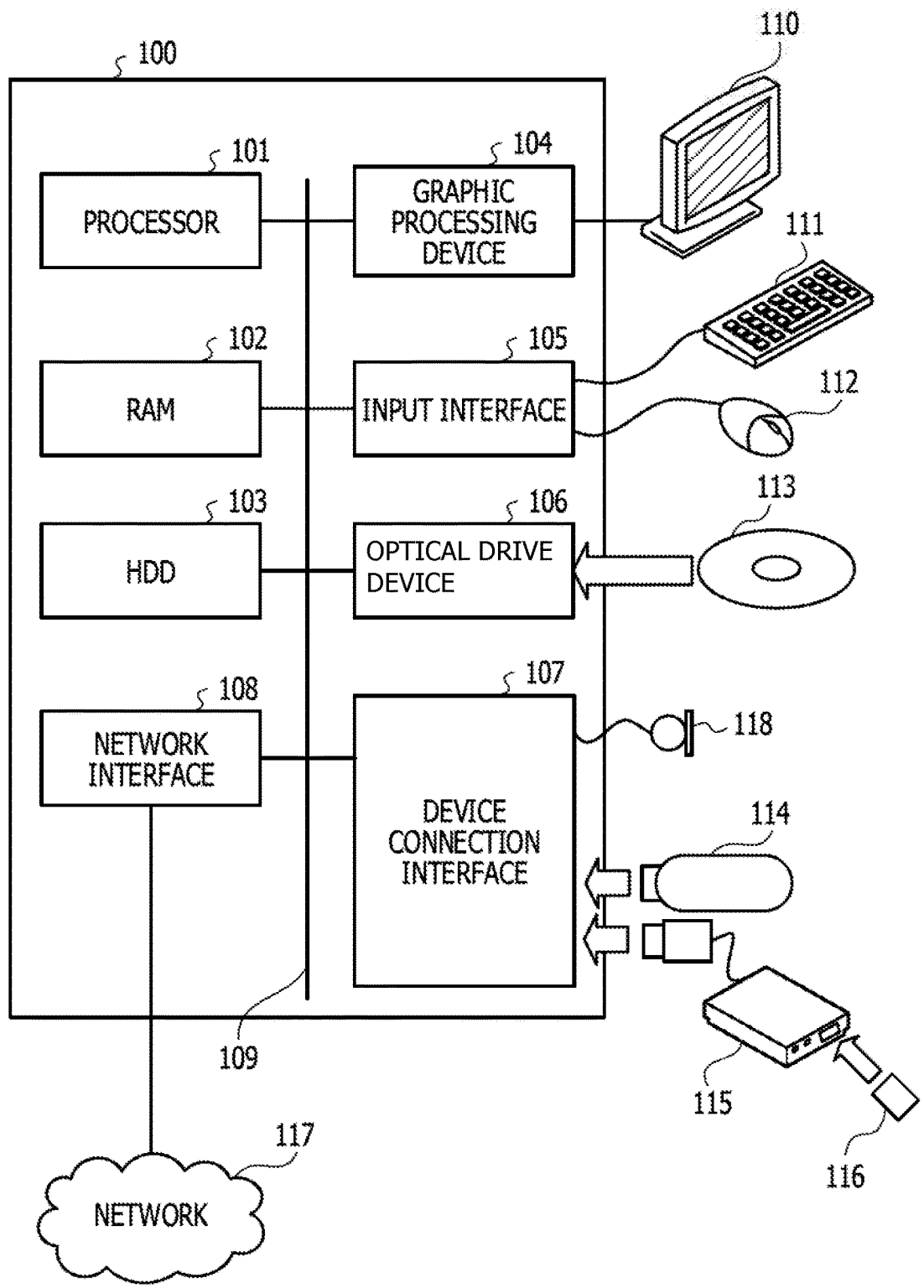
FIG. 18 illustrates a hardware configuration of a computer functioning as a voice processing apparatus of an embodiment.

FIG. 18 illustrates a hardware configuration of a computer 100 functioning as the voice processing apparatus 1 of an embodiment. Referring to FIG. 18, the voice processing apparatus 1 includes the computer 100 and input and output devices (peripheral devices) connected to the computer 100.

The computer 100 is generally controlled by a processor 101. The processor 101 is connected to a random access memory (RAM) 102 and multiple peripheral devices via a bus 109. The processor 101 may be a multi-processor. The processor 101 may be a central processing unit (CPU), a micro processing unit (MPU), a digital signal processor (DSP), an application specific integrated circuit (ASIC), or a programmable logic circuit (PLD). The processor 101 may be a combination of two or more of the CPU, the MPU, the DSP, the ASIC, and the PLD. The processor 101 may execute the processes of the functional blocks of the acquisition unit 2, the detecting unit 3, the calculating unit 4, the determining unit 5 and the like illustrate in FIG. 1. For example, the processor 101 may perform the processes of the acquisition unit 2, the detecting unit 3, the calculating unit 4, and the determining unit 5 that are implemented as function modules by a computer program.

The RAM 102 is used as a main memory of the computer 100. The RAM 102 temporarily stores an operating system (OS) to be executed by the processor 101, and at least part of an application program. The RAM 102 temporarily stores the program of the function modules that implement the processes of the acquisition unit 2, the detecting unit 3, the calculating unit 4, and the determining unit 5 of FIG. 1. The RAM 102 also stores a variety of data (such as the first threshold value to the sixth threshold value, the correlation coefficient to be calculated by the calculating unit 4, and other data) to be used in processes performed by the processor 101. The peripheral devices connected to the bus 109 include a hard disk drive (HDD) 103, a graphic processing device 104, an input interface 105, an optical drive device 106, a device connection interface 107, and a network interface 108.

The HDD 103 writes or reads data magnetically on an internal magnetic disk thereof. The HDD 103 is used as an auxiliary memory device of the computer 100. The HDD 103 stores the OS, the application program, and a variety of data. Also used as the auxiliary memory device is a semiconductor memory device, such as a flash memory. The HDD 103 may store a variety of data for the processes to be performed by the processor 101 (such as the first threshold value through the sixth threshold value, the correlation coefficient calculated by the calculating unit 4 of FIG. 1, and other data).

The graphic processing device 104 is connected to a monitor 110. In response to a command from the processor 101, the graphic processing device 104 causes the monitor 110 to display a variety of images on the screen thereof. The monitor 110 may be a cathode ray tube (CRT) display device or a liquid-crystal display device. The monitor 110 may be the external device to which the determination results of the determining unit 5 of FIG. 1 are output.

The input interface 105 is connected to a keyboard 111 and a mouse 112. The input interface 105 transmits signals from the keyboard 111 and the mouse 112 to the processor 101. The mouse 112 is an example of a pointing device. Other pointing devices may be used. The other pointing devices may include a touchpanel, a tablet, a touchpad, and a trackball. The user of the voice processing apparatus 1 may use the keyboard 111 and the mouse 112 to command the voice processing process to be started or ended.

The optical drive device 106 reads data stored on an optical disk 113 using a laser light beam. The optical disk 113 is a portable type recording medium on which data are recorded in a manner such that the data are read through light reflections. The optical disks 113 include digital versatile disc (DVD), DVD-RAM, compact disc read only memory (CD-ROM), CD-recordable (CD-R) disc, and CD-rewritable (CD-RW) disc. The program stored on the optical disk 113 serving as a portable recording medium may be installed onto the voice processing apparatus 1 via the optical drive device 106. The installed program is ready to be executed by the voice processing apparatus 1.

The device connection interface 107 connects the computer 100 to the peripheral devices. For example, the device connection interface 107 is connected to a memory device 114 and a memory reader-writer 115. The memory device 114 has a communication function with the device connection interface 107. The memory reader-writer 115 writes data onto a memory card 116, and reads data from the memory card 116. The memory card 116 is a card-type recording medium. The device connection interface 107 may be connected to microphones 118 (in a wired or wireless fashion). Multiple microphones 118 may be connected to the device connection interface 107, and receive the first voice of the first user and the second voice of the second user. The first voice and the second voice are input to the processor 101 via the device connection interface 107, and the processor 101 performs the process of the acquisition unit 2 of FIG. 1 that is implemented as a function module by a computer program.

The network interface 108 is connected to a network 117. The network interface 108 exchanges data with another computer or a communication apparatus via the network 117. The network interface 108 may receive the first voice of the first user and the second voice of the second user from the other computer or the communication apparatus via the network 117. The first voice and the second voice are input to the processor 101 via the network interface 108, and the processor 101 may perform the process of the acquisition unit 2 of FIG. 1 that is implemented as the function module by the computer program.

The computer 100 executes the program stored on a computer readable recording medium, thereby performing the voice processing function. The program describing the contents of the processes to be executed by the computer 100 may be stored on a variety of recording media. The program may include one or more function modules. For example, the program may include the function modules that may implement the processes of the acquisition unit 2, the detecting unit 3, the calculating unit 4, the determining unit 5, and other elements of FIG. 1. The program to be executed by the computer 100 may be stored in the HDD 103. The processor 101 may load at least part of the program on the HDD 103 onto the RAM 102 to execute the program. The program to be executed by the computer 100 may be stored on a portable recording medium, such as the optical disk 113, the memory device 114, or the memory card 116. The program stored on the portable recording medium may be installed on the HDD 103 under the control of the processor 101, and the processor 101 may directly read the program to execute the program.

The elements of each apparatus described above are not necessarily have to be physically organized as illustrated in the drawings. More specifically, specific forms in terms of segmentation and integration of each apparatus are not limited to those illustrated in the drawings. Whole or part of each apparatus may be functionally or physically segmented or integrated by any unit in response to a variety of workloads and use state. The variety of processes described above may be performed when a computer, such as a personal computer or a workstation, executes a prepared program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A voice processing apparatus comprising:
   a memory; and
   a processor coupled to the memory and the processor configured to:
      acquire a first input signal containing a first voice, and a second input signal containing a second voice;
      obtain a first signal intensity of the first input signal, and a second signal intensity of the second input signal;

specify a correlation coefficient between a time sequence of the first signal intensity and a time sequence of the second signal intensity;

determine whether the first voice and the second voice are in a conversation state or not based on the specified correlation coefficient, the first voice and the second voice being determined to be in the conversation state when a value of the specified correlation coefficient is less than a first threshold, the first threshold being a negative value of the correlation coefficient; and output information indicating an association between the first voice and the second voice when it is determined that the first voice and the second voice are in the conversation state.

2. The voice processing apparatus according to claim 1, wherein
the first signal intensity is power of the first voice or a signal-to-noise ratio of the first voice, and the second signal intensity is power of the second voice or a signal-to-noise ratio of the second voice.

3. The voice processing apparatus according to claim 1, wherein
the processor is further configured to:
detect a first speech period contained in the first input signal in response to the first signal intensity;
detect a second speech period contained in the second input signal in response to the second signal intensity;
detect a speech overlapping period when the first speech period overlaps the second speech period; and
specify, in the specifying, the correlation coefficient excluding the first signal intensity and the second signal intensity having the speech overlapping period less than a second threshold.

4. The voice processing apparatus according to claim 1, wherein
the processor is further configured to:
detect a first silent period contained in the first input signal in response to the first signal intensity;
detect a second silent period contained in the second input signal in response to the second signal intensity;
detect a silent overlapping period when the first silent period overlaps the second silent period; and
specify, in the specifying, the correlation coefficient excluding the first signal intensity and the second signal intensity having the silent overlapping period less than a third threshold.

5. The voice processing apparatus according to claim 1, wherein
the processor is further configured to:
specify, in the specifying, a plurality of correlation coefficients by varying a first phase of the first signal intensity or a second phase of the second signal intensity within a specific range; and
determine, in the determining, whether the first voice and the second voice are in the conversation state, using the correlation coefficient having a minimum value from among the plurality of correlation coefficients.

6. The voice processing apparatus according to claim 1, wherein
the processor is further configured to:
compare a magnitude of a time sequence of the first signal intensity to a magnitude of a time sequence of the second signal intensity;
detect a correlation coefficient calculation period when a count of inversions at which the comparison is inverted is equal to or above a fourth threshold value; and
specify, in the specifying, the correlation coefficient between the time sequence of the first signal intensity and the time sequence of the second signal intensity within the correlation coefficient calculation period.

7. The voice processing apparatus according to claim 1, wherein
the processor is further configured to:
acquire a third input signal containing a third voice;
obtain a third signal intensity of the third input signal;
specify, in the specifying, a plurality of correlation coefficients, each correlation coefficient for a combination of every two signal intensities from among the time sequence of the first signal intensity, the time sequence of the second signal intensity and the time sequence of the third signal intensity; and
determine voices in the conversation state from among the first voice, the second voice and the third voice based on the correlation coefficient having a minimum value from among the plurality of correlation coefficients.

8. The voice processing apparatus according to claim 7, wherein
the processor is further configured to:
obtain an addition signal intensity that is a sum of the two signal intensities corresponding to the correlation coefficient having the minimum value; and
specify a reference correlation coefficient between a time sequence of the addition signal intensity and a time sequence of one signal intensity other than the two signal intensities corresponding to the correlation coefficient having the minimum value; and
determine a combination of voices in the conversation state based on the three signal intensities corresponding to the reference correlation coefficient when the correlation coefficient having the minimum value is less than the reference correlation coefficient or less than the first threshold value.

9. The voice processing apparatus according to claim 8, wherein
the processor is further configured to:
specify the reference correlation coefficient when the silent overlapping period of the two signal intensities corresponding to the correlation coefficient having the minimum value is equal to or above a fifth threshold value.

10. The voice processing apparatus according to claim 1, wherein
the processor is further configured to:
obtain the second signal intensity contained in the first input signal or the first signal intensity contained in the second input signal;
specify a second correlation coefficient between a time sequence of the second signal intensity contained in the first input signal and the time sequence of the second signal intensity contained in the second input signal or a third correlation coefficient between a time sequence of the first signal intensity contained in the second input signal and the time sequence of the first signal intensity contained in the first input signal; and determine whether the first voice and the second voice are in the conversation state or not based on the second correlation coefficient or the third correlation coefficient.

11. The voice processing apparatus according to claim 10, wherein the processor is further configured to:
determine that the first voice and the second voice are in the conversation state when the correlation coefficient is positive and when the second correlation coefficient is equal to or above a sixth threshold value.

12. A voice processing method executed by a computer, the voice processing method comprising:

acquiring a first input signal containing a first voice, and a second input signal containing a second voice;

obtaining a first signal intensity of the first input signal, and a second signal intensity of the second input signal;

specifying a correlation coefficient between a time sequence of the first signal intensity and a time sequence of the second signal intensity;

determining whether the first voice and the second voice are in a conversation state or not based on the specified correlation coefficient, the first voice and the second voice being determined to be in the conversation state when a value of the specified correlation coefficient is less than a first threshold, the first threshold being a negative value of the correlation coefficient; and outputting information indicating an association between the first voice and the second voice when it is determined that the first voice and the second voice are in the conversation state.

13. A non-transitory computer-readable storage medium storing a voice processing program that causes a computer to execute a process comprising:

acquiring a first input signal containing a first voice, and a second input signal containing a second voice;

obtaining a first signal intensity of the first input signal, and a second signal intensity of the second input signal;

specifying a correlation coefficient between a time sequence of the first signal intensity and a time sequence of the second signal intensity;

determining whether the first voice and the second voice are in a conversation state or not based on the specified correlation coefficient, the first voice and the second voice being determined to be in the conversation state when a value of the specified correlation coefficient is less than a first threshold, the first threshold being a negative value of the correlation coefficient; and outputting information indicating an association between the first voice and the second voice when it is determined that the first voice and the second voice are in the conversation state.

* * * * *